United States Patent
Kobayashi et al.

[11] Patent Number: 5,841,180
[45] Date of Patent: Nov. 24, 1998

[54] PHOTOELECTRIC CONVERSION DEVICE, METHOD OF DRIVING PHOTOELECTRIC CONVERSION DEVICE, AND SYSTEM HAVING THE DEVICE

[75] Inventors: Isao Kobayashi, Atsugi; Noriyuki Kaifu, Tokyo, both of Japan

[73] Assignee: Canon Kabushiki Kaisha, Tokyo, Japan

[21] Appl. No.: 824,333

[22] Filed: Mar. 26, 1997

[30] Foreign Application Priority Data

Mar. 27, 1996 [JP] Japan .................................... 8-072501
Oct. 24, 1996 [JP] Japan .................................... 8-282343

[51] Int. Cl.$^6$ .................................................. H01L 31/00
[52] U.S. Cl. ...................................... 257/448; 250/208.1
[58] Field of Search ............................ 257/448; 250/206, 250/208.1

[56] References Cited

U.S. PATENT DOCUMENTS 5,060,040 10/1991 Saika et al. ................................ 357/30
5,317,406 5/1994 Kobayashi et al. ..................... 348/307
5,335,094 8/1994 Kaifu et al. .............................. 358/494

Primary Examiner—Ngân V. Ngô
Attorney, Agent, or Firm—Fitzpatrick, Cella, Harper & Scinto

[57] ABSTRACT

In order to restrain shifts of the flat-band voltage by driving a photoelectric conversion element and to assure a broad dynamic range, high S/N ratio, and stable characteristics, a photoelectric conversion device, which has, on an insulating substrate, a first electrode layer, a first insulating layer for blocking passage of both a carrier of a first type and a carrier of a second type having a different polarity from that of the carrier of the first type, a photoelectric conversion semiconductor layer, an injection blocking layer for blocking injection of the carrier of the first type into the semiconductor layer, and a second electrode layer, has a switch means for repetitively performing, in a predetermined order, following three operation modes for applying an electric field to the individual layers of the photoelectric conversion element: (1) a photoelectric conversion mode for producing and accumulating a charge in correspondence with an incident light amount; (2) a refresh mode for refreshing the charge accumulated in the photoelectric conversion element; and (3) a flat-band voltage shift restraining mode for restraining shifts of the flat-band voltage of the photoelectric conversion element.

27 Claims, 28 Drawing Sheets

$V_{rG} \gtreqqless V_D - V_{FB}$ $V_{FB} = 0$ $V_{FB} > 0$ $V_{FB} < 0$ $V_{rG} < V_D - V_{FB}$

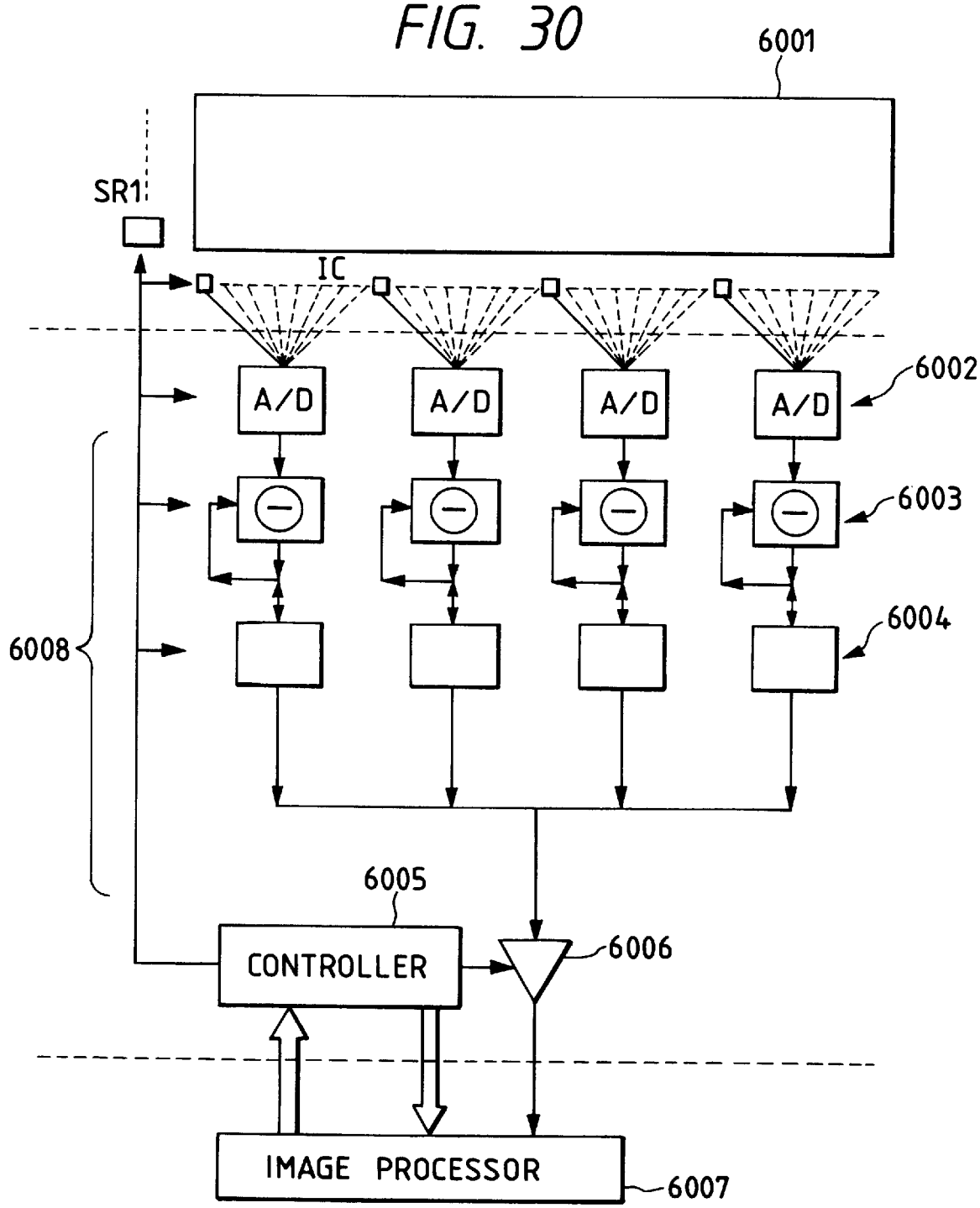

PHOTOELECTRIC CONVERSION DEVICE, METHOD OF DRIVING PHOTOELECTRIC CONVERSION DEVICE, AND SYSTEM HAVING THE DEVICE

BACKGROUND OF THE INVENTION

1. Field of the Invention

The present invention relates to a photoelectric conversion device, its driving method, and a system having the device and, more particularly, to a one- or two-dimensional photoelectric conversion device which can attain equal-magnification reading in a facsimile apparatus, a digital copying machine, an X-ray image sensing apparatus, or the like, its driving method, and a system having the device.

2. Related Background Art

As a conventional reading system for a facsimile apparatus, a digital copying machine, an X-ray image sensing apparatus, or the like, a reading system using a reduction optical system and a CCD sensor is used. However, in recent years, as a result of development of photoelectric conversion semiconductor materials represented by hydrogenated amorphous silicon (to be abbreviated as "a-Si" hereinafter), so-called contact sensors which are constituted by forming photoelectric conversion elements on a large-area substrate and can attain reading by an optical system at an equal magnification to an information source have been developed extensively. In particular, since a-Si can be used not only as a photoelectric conversion material but also a thin film field effect transistor (to be abbreviated as a "TFT" hereinafter), photoelectric conversion semiconductor layers and semiconductor layers of TFTs can be simultaneously formed on a single substrate.

FIGS. 1A and 1B are sectional views showing the structures of photosensors. FIGS. 1A and 1B respectively show the layer structures of two different photosensors, and FIG. 1C is a schematic circuit diagram for explaining a typical driving method common to these sensors. FIGS. 1A and 1B show photodiode type photosensors, which are respectively called a PIN type sensor (FIG. 1A, and a Schottky type sensor (FIG. 1B). FIGS. 1A and 1B illustrate an insulating substrate 1, a lower electrode 2, a p-type semiconductor layer (to be referred to as a "p-layer" hereinafter) 3, an intrinsic semiconductor layer (to be referred to as an "i-layer" hereinafter) 4, an n-type semiconductor layer (to be referred to as an "n-layer" hereinafter) 5, and a transparent electrode 6. In the photosensor shown in FIG. 1B as a Schottky type sensor, the material of the lower electrode 2 is appropriately selected to form a Schottky barrier layer so as to prevent electron injection from the lower electrode 2 to the i-layer 4. In FIG. 1C, a photosensor 10 symbolizes the above-mentioned photosensor, and is connected to a power supply 11 and a detection unit 12 such as a current amplifier. The side indicated by C in the photosensor 10 corresponds to the transparent electrode 6 side in FIGS. 1A and 1B, and the side indicated by A corresponds to the lower electrode 2 side. The power supply 11 is set to apply a positive voltage to the side C with respect to the side A.

The operation of the sensor will be briefly described below. When light comes from a direction indicated by an arrow in FIG. 1A or 1B, and reaches the i-layer 4, the light is absorbed, and electrons and holes are produced. Since the i-layer 4 is applied with an electric field from the power supply 11, electrons move toward the side C, i.e., toward the transparent electrode 6 through the n-layer 5, and holes move toward the side A, i.e., toward the lower electrode 2. As a result, photocurrents flow through the photosensor 10. When no light is incident, the i-layer 4 produces neither electrons nor holes. On the other hand, the holes in the transparent electrode 6 cannot move since the n-type layer 5 serves as a hole injection blocking layer. Furthermore, the p-layer 3 in the photosensor shown in FIG. 1A as a PIN type sensor or the Schottky barrier layer in the photosensor shown in FIG. 1B as a Schottky type sensor serves as an electron injection blocking layer. In this manner, both the electrons and holes cannot move, and no currents flow. Accordingly, the currents change depending on the presence/absence of incident light, and when such changes are detected by the detection unit 12 shown in FIG. 1C, the operation of the photosensor is realized.

However, it is not easy to manufacture a photoelectric conversion device with a high S/N ratio and low cost using the above-mentioned photosensor. The reasons for this problem will be explained below.

First, two injection blocking layers are required in both the photosensor shown in FIG. 1A as a PIN type sensor and the photosensor shown in FIG. 1B as a Schottky type sensor. In the PIN type sensor, the n-layer 5 serving as an injection blocking layer must have characteristics of blocking electron flow into the transparent electrode 6, and simultaneously, blocking hole injection into the i-layer 4. On the other hand, in the Schottky type sensor, the Schottky barrier layer 4 has characteristics of blocking electrons from the lower electrode and blocking holes from the n-layer 5. If one of these characteristics is impaired, the photocurrents lower or currents are produced and increase when no light is incident (such currents will be referred to as "dark currents" hereinafter), thus causing a decrease in S/N ratio. The dark current itself is considered as noise, and at the same time, includes fluctuations called shot noise, i.e., so-called quantum noise. Even when the detection unit 12 makes processing for subtracting the dark currents, the quantum noise caused by the dark currents cannot be reduced.

Normally, in order to improve these characteristics, the film formation conditions of the i-layer 4 and n-layer 5 or the annealing conditions after film formation must be optimized. However, the p-layer 3 as another injection blocking layer requires equivalent characteristics although it must block electrons, and similarly requires optimization of the individual conditions.

In general, the optimization conditions for the n-layer are not the same as those for the p-layer, and it is not easy to simultaneously satisfy the conditions of the two layers. That is, the requirement of the two injection blocking layers in a single photosensor makes formation of a photosensor with a high-S/N ratio difficult. The same applies to the photosensor shown in FIG. 1B as a Schottky type sensor. The photosensor shown in FIG. 1B as a Schottky type sensor uses the Schottky barrier layer as one injection blocking layer, which uses the difference between the work functions of the lower electrode 2 and the i-layer 4. With this structure, the material of the lower electrode 2 is limited, and the localized level of the interface largely influences the characteristics. For this reason, it is not easy to satisfy the conditions. In one proposed report, in order to further improve the characteristics of the Schottky barrier layer, a thin silicon or metal oxide or nitride layer having a thickness of about 100 Å is formed between the lower electrode 2 and the i-layer 4. This structure allows holes to flow toward the lower electrode 2 using the tunnel effect to improve the effect of blocking electrons from being injected into the i-layer 4, and also utilizes the difference between the work functions. For this reason, the material of the lower electrode 2 must be limited, and by utilizing conflicting natures, i.e., the electron injection blocking and hole movement by the tunnel effect, the thickness of the oxide or nitride film is limited to a very small value, i.e., about 100 Å. Also, it is not easy to control the thickness and film quality, thus lowering productivity.

The requirement of the two injection blocking layers also decreases productivity and increases cost. Since the injection blocking layers are important in terms of characteristics, if even one of the two layers suffers defects due to, e.g., dust, sufficiently high characteristics of the photosensor cannot be obtained.

The second reason will be explained below with reference to FIG. 2. FIG. 2 shows the layer structure of a thin-film field effect transistor (TFT) formed by thin-film semiconductor layers. The TFT is often used as a portion of a control section upon forming a photoelectric conversion device. The same reference numerals in FIG. 2 denote the same parts as in FIGS. 1A and 1B. FIG. 2 illustrates a gate insulating film 7 and an upper electrode 60 in addition to the structure shown in FIGS. 1A and 1B. The TFT shown in FIG. 2 is normally formed by forming, in turn, a lower electrode 2 serving as a gate electrode, a gate insulating film 7, an i-layer 4, an n-layer 5, and an upper electrode 60 serving as source and drain electrodes on the insulating substrate 1, etching the upper electrode 60 to form source and drain electrodes, and thereafter, forming a channel portion by etching the n-layer 5 using the source and drain electrodes 60 as a mask. The characteristics of the TFT are sensitive to the state of the interface between the gate insulating layer 7 and the i-layer, and the individual layers are often stacked successively in an identical vacuum atmosphere to prevent contamination of the interface.

When the photosensor and the TFT are formed on a single substrate, their layer structures pose a problem, and result in high cost and low characteristics. This is because the photosensor shown in FIG. 1A or 1B has a layer structure different from the TFT, i.e., the PIN type sensor shown in FIG. 1A has a layer structure including, in turn from the substrate side, electrode/p-layer/i-layer/n-layer/electrode, or the Schottky type sensor shown in FIG. 1B has a layer structure including, in turn from the substrate side, electrode/i-layer/n-layer/electrode, while the TFT has a layer structure including, in turn from the substrate side, electrode/insulating film/i-layer/n-layer/electrode. This means that the photosensor and -the TFT cannot be formed in a single process, and complicate processes and an increase in the number of steps result in a low yielding ratio and high cost. In order to commonly use the i-layer/n-layer between the photosensor and the TFT, etching of the gate insulating film 7 or the p-layer 3 is required. As a consequence, the p-layer 3 as the injection blocking layer as an important layer of the photosensor, and the i-layer 4 cannot be formed in an identical vacuum atmosphere, or the interface between the gate insulating film 7 and the i-layer 4, which is important in the TFT, is contaminated by etching of the gate insulating film, resulting in poor characteristics and a low S/N ratio.

The Schottky type sensor shown in FIG. 1B, which is formed with the oxide or nitride film between the lower electrode 2 and the i-layer 4 to improve its characteristics, has the same order of the layer structure as that of the TFT. However, as described above, since the oxide or nitride film must have a thickness of about 100 Å, it cannot be commonly used as the gate insulating film 7. FIG. 3 shows an example of our experimental results associated with the thickness of the gate insulating film 7 and the yielding ratio of the TFT. When the thickness of the gate insulating film is 1,000 Å or less, the yielding ratio drops abruptly. When the thickness is 800 Å, the yielding ratio is about 30%; when the thickness is 500 Å, the yielding ratio is 0%. When the thickness is 250 Å, the TFT failed to operate. It is obviously difficult to commonly use the oxide or nitride film of the photosensor that uses the tunnel effect as the gate insulating film of the TFT, which must insulate electrons or holes, and the above data demonstrate this fact.

Furthermore, although not shown, it is also difficult to form a capacitive element (to be referred to as a "capacitor" hereinafter) as an element which is required for obtaining the integral value of charges or currents so as to have the same structure as that of the above-mentioned photosensor and good characteristics suffering less leakage. Since the capacitor aims at accumulating charges between two electrodes, a layer for blocking movement of electrons and holes is indispensable as an intermediate layer between the two electrodes, while since the above-mentioned photosensor uses a semiconductor layer alone between electrodes, it is difficult to obtain an intermediate layer having thermally stable, good characteristics suffering less leakage.

Since matching between the photosensor, and the TFT and capacitor as important elements making up a photoelectric conversion device, is poor in terms of processes or characteristics, a large number of complicate processes are required upon building a system in which a large number of photosensors are one-or two-dimensionally arranged and their optical signals are sequentially detected, resulting in a very low yielding ratio. As a result, this poses a very serious problem in the manufacture of a high-performance, multi-function device with low cost.

SUMMARY OF THE INVENTION

It is an object of the present invention to provide a photoelectric conversion device which has a high S/N ratio and stable characteristics, its driving method, and a system having the device.

More specifically, it is another object of the present invention to provide a photoelectric conversion device, which applies an electric field in a direction opposite to that during photoelectric conversion to a photoelectric conversion element to restrain shifts of the flat-band voltage of the photoelectric conversion element, so as to consequently prevent the dynamic range from narrowing, i.e., to assure a high S/N ratio and stable characteristics, its driving method, and a system.

It is still another object of the present invention to provide a photoelectric conversion device which has a high yielding ratio and stable characteristics, and a system having the device.

It is still another object of the present invention to provide a photoelectric conversion device which can be formed together with a TFT in a single process, and can be manufactured with low cost without complicating the manufacturing process, its driving method, and a system having the device.

It is still another object of the present invention to provide a photoelectric conversion device which changes the electric field to be applied to the individual layers of a photoelectric conversion element in a photoelectric conversion mode to measure any shift of the flat-band voltage of the photoelectric conversion element, detects a carrier of a first type accumulated in a semiconductor layer or a carrier of a second type flowing into a second electrode layer to obtain a voltage value corresponding to the flat-band voltage of the photoelectric conversion element, and restrains the flat-band voltage shift using the detection result, so as to consequently prevent the dynamic range from narrowing, i.e., to assure a high S/N ratio and stable characteristics, its driving method, and a system.

It is still another object of the present invention to provide a photoelectric conversion device, which applies an electric field in a direction opposite to that during photoelectric conversion to a photoelectric conversion element to restrain shifts of the flat-band voltage of the photoelectric conversion element, so as to consequently prevent the dynamic range from narrowing, i.e., to assure a high S/N ratio and stable characteristics, its driving method, and a system.

The present invention has been made to solve the above-mentioned problems and has as its object to provide a photoelectric conversion device, which has a photoelectric conversion element formed by stacking, on an insulating substrate, a first electrode layer, a first insulating layer for blocking passage of both a carrier of a first type and a carrier of a second type having a different polarity from that of the carrier of the first type, a photoelectric conversion semiconductor layer, an injection blocking layer for blocking injection of the carrier of the first type into the semiconductor layer, and a second electrode layer, comprising switch means for repetitively performing in a predetermined order, following three operation modes for applying an electric field to the individual layers of the photoelectric conversion element:

(1) a photoelectric conversion mode for producing and accumulating a charge in correspondence with an incident light amount;

(2) a refresh mode for refreshing the charge accumulated in the photoelectric conversion element; and (3) a flat-band voltage shift restraining mode for restraining a shift of a flat-band voltage of the photoelectric conversion element.

It is anther object of the present invention to provide a method of driving a photoelectric conversion device, which repetitively performing, in a predetermined order, the following three operation modes for applying an electric field to the individual layers of a photoelectric conversion device:

(1) a photoelectric conversion mode for producing and accumulating a charge in correspondence with an incident light amount;

(2) a refresh mode for refreshing the charge accumulated in the photoelectric conversion element; and (3) a flat-band voltage shift restraining mode for restraining a shift of a flat-band voltage of the photoelectric conversion element.

It is still another object of the present invention to provide a system which comprises a photoelectric conversion device having a wavelength converter, signal processing means for processing a signal from the photoelectric conversion device, recording means for recording a signal from the signal processing means, display means for displaying the signal from the signal processing means, transmission means for transmitting the signal from the signal processing means, and a light source including an X-ray source for generating optical information to be input to the photoelectric conversion device.

It is still another object of the present invention to provide a method of driving a photoelectric conversion element in a photoelectric conversion device, which has a photoelectric conversion element formed by stacking, on an insulating substrate, a first electrode layer, a first insulating layer for blocking passage of both a carrier of a first type and a carrier of a second type having a different polarity from that of the carrier of the first type, a photoelectric conversion semiconductor layer, an injection blocking layer for blocking injection of the carrier of the first type into the semiconductor layer, and a second electrode layer, comprising:

a power supply unit for applying an electric field to the individual layers of the photoelectric conversion element in a direction to flow the carrier of the first type from the semiconductor layer to the second electrode layer in a refresh mode, and applying an electric field to the individual layers of the photoelectric conversion element in a direction to accumulate the carrier of the first type produced by light incident on the semiconductor layer in the semiconductor layer and to flow the carrier of the second type toward the second electrode layer in a photoelectric conversion mode; and a detection unit for detecting the carrier of the first type accumulated in the semiconductor layer or the carrier of the second type flowing toward the second electrode layer in the photoelectric conversion mode, wherein a voltage value corresponding to a flat-band voltage of the photoelectric conversion element is obtained by changing the electric field to be applied to the individual layers of the photoelectric conversion element in the photoelectric conversion mode so as to detect the carrier of the first type accumulated in the semiconductor layer or the carrier of the second type flowing toward the second electrode layer.

It is still another object of the present invention to provide a photoelectric conversion device which has switch means for selectively performing, using the voltage value corresponding to the flat-band voltage obtained by the above-mentioned method, following three operation modes for applying an electric field to the individual layers of a photoelectric conversion element:

(1) a photoelectric conversion mode for producing and accumulating a charge in correspondence with an incident light amount;

(2) a refresh mode for refreshing the charge accumulated in the photoelectric conversion element; and (3) a flat-band voltage shift restraining mode for restraining for a shift of a flat-band voltage of the photoelectric conversion element.

It is still another object of the present invention to provide a method of driving a photoelectric conversion device, which has a photoelectric conversion element formed by stacking, on an insulating substrate, a first electrode layer, a first insulating layer for blocking passage of both a carrier of a first type and a carrier of a second type having a different polarity from that of the carrier of the first type, a photoelectric conversion semiconductor layer, an injection blocking layer for blocking injection of the carrier of the first type into the semiconductor layer, and a second electrode layer, comprising:

a power supply unit for applying an electric field to the individual layers of the photoelectric conversion element in a direction to flow the carrier of the first type from the semiconductor layer to the second electrode layer in a refresh mode, and applying an electric field to the individual layers of the photoelectric conversion element in a direction to accumulate the carrier of the first type produced by light incident on the semiconductor layer in the semiconductor layer and to flow the carrier of the second type to the second electrode layer in a photoelectric conversion mode; and a detection unit for detecting the carrier of the first type accumulated in the semiconductor layer or the carrier of the second type flowing toward the second electrode layer in the photoelectric conversion mode, wherein a voltage value corresponding to a flat-band voltage of the photoelectric conversion element is obtained by changing the electric field to be applied to the individual layers of the photoelectric conversion element in the photoelectric conversion mode so as to detect the carrier of the first type accumulated in the semiconductor layer or the carrier of the second type flowing toward the second electrode layer, and following three operation modes for applying an electric field to the individual layers of the photoelectric conversion element are selectively performed via switch means using the obtained voltage value corresponding to the flat-band voltage:

(1) a photoelectric conversion mode for producing and accumulating a charge in correspondence with an incident light amount;

(2) a refresh mode for refreshing the charge accumulated in the photoelectric conversion element; and (3) a flat-band voltage shift restraining mode for restraining a shift of a flat-band voltage of the photoelectric conversion element.

It is still another object of the present invention to provide a system which comprises a photoelectric conversion device having a wavelength converter such as a phosphor, signal processing means for processing a signal from the photoelectric conversion device, recording means for recording a signal from the signal processing means, display means for displaying the signal from the signal processing means, transmission means for transmitting the signal from the signal processing means, and a light source such as an X-ray source for generating optical information to be input to the photoelectric conversion device.

It is still another object of the present invention to provide a method of driving a photoelectric conversion element in a photoelectric conversion device, which has a photoelectric conversion element formed by stacking, on an insulating substrate, sucessively, a first electrode layer, a first insulating layer for blocking passage of both a carrier of a first type and a carrier of a second type having a different polarity from that of the carrier of the first type, a photoelectric conversion semiconductor layer, an injection blocking layer for blocking injection of the carrier of the first type into the semiconductor layer, and a second electrode layer, comprising:

a power supply unit for applying an electric field to the individual layers of the photoelectric conversion element in a direction to flow the carrier of the first type from the semiconductor layer to the second electrode layer in a refresh mode, and applying an electric field to the individual layers of the photoelectric conversion element in a direction to accumulate the carrier of the first type produced by light incident on the semiconductor layer in the semiconductor layer and to flow the carrier of the second type to the second electrode layer in a photoelectric conversion mode; and a detection unit for detecting the carrier of the first type accumulated in the semiconductor layer or the carrier of the second type flowing toward the second electrode layer in the photoelectric conversion mode, wherein a voltage value corresponding to a flat-band voltage of the photoelectric conversion element is obtained by changing the electric field to be applied to the individual layers of the photoelectric conversion element in the photoelectric conversion mode so as to detect the carrier of the first type accumulated in the semiconductor layer or the carrier of the second type flowing toward the second electrode layer.

According to the present invention, in order to measure shifts of the flat-band voltage of the photoelectric conversion element, a voltage value corresponding to the flat-band voltage of the photoelectric conversion element is obtained by changing the electric field to be applied to the individual layers of the photoelectric conversion element in the photoelectric conversion mode and detecting the carrier of the first type accumulated in the semiconductor layer or the carrier of the second type flowing toward the second electrode layer, and the flat-band voltage shifts are restrained using the detection result, thus providing a photoelectric conversion device which can consequently prevent the dynamic range from narrowing, i.e., can assure a high S/N ratio and stable characteristics.

According to the present invention, in order to restrain shifts of the flat-band voltage of the photoelectric conversion element, since an electric field is applied to the photoelectric conversion element in a direction opposite to that in the photoelectric conversion operation, the dynamic range can be consequently prevented from narrowing, i.e., a high S/N ratio and stable characteristics can be assured.

In addition, according to the present invention, a photoelectric conversion device which can be formed together with a TFT in a single process, and can be manufactured with low cost without complicating the manufacturing process, its driving method, and a system having the device can be provided.

Furthermore, according to the present invention, a photoelectric conversion device which has a high yielding ratio and stable characteristics, and a system having the device can be provided.

BRIEF DESCRIPTION OF THE DRAWINGS

FIG. 30 is a schematic block diagram for explaining an example of a system having the photoelectric conversion device;

DETAILED DESCRIPTION OF THE PREFERRED EMBODIMENTS

The present invention will be described in detail hereinafter with reference to the accompanying drawings as needed.

Prior to a description of the present invention, a preferred photoelectric conversion device and its basic refresh operation will be explained.

Figure 4A:
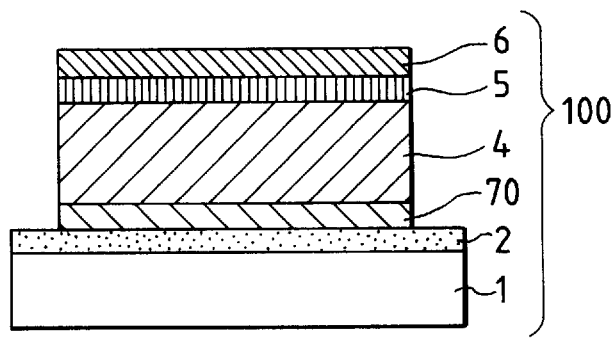
FIG. 4A is a schematic sectional view for explaining an example of a photoelectric conversion element.
Figure 4B:
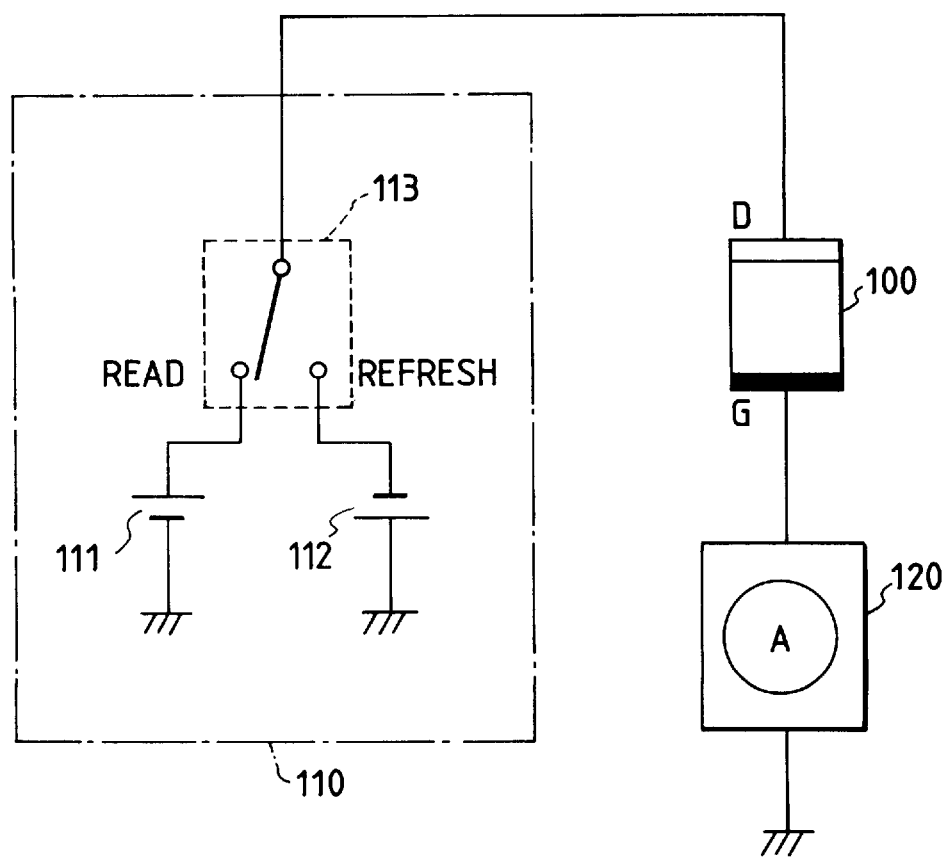
FIG. 4B is a schematic equivalent circuit diagram using the photoelectric conversion element shown in FIG. 4A.

FIGS. 4A and 4B are respectively a schematic sectional view showing the layer structure to explain a photoelectric conversion element of a photoelectric conversion device, and a schematic circuit diagram of the photoelectric conversion device.

Referring to FIG. 4A, an insulating substrate 1 consists of, e.g., glass or the like, and a lower electrode 2 consists of a conductive material such as Al, Cr, or the like. An insulating layer 70 consists of silicon nitride (SiN) or the like for blocking passage of both electrons and holes, and its thickness is set at 500 Å or more that can prevent drift of electrons and holes due to the tunnel effect. A photoelectric conversion semiconductor layer 4 consists of an intrinsic (or substantially intrinsic) semiconductor i-layer of a non-monocrystalline semiconductor material including an amorphous semiconductor material such as hydrogenated amorphous silicon (a-Si:H). An injection blocking layer 5 consists of an a-Si $n^+$-layer that blocks injection of holes from the side of a transparent electrode 6. The transparent electrode 6 consists of a compound such as ITO, oxide, or the like that contains indium or tin.

Referring to FIG. 4B, a photoelectric conversion element 100 symbolizes that shown in FIG. 4A, and has a D electrode on the transparent electrode 6 side and a G electrode on the lower electrode 2 side. A detection unit 120 detects currents that flow through the photoelectric conversion element 100. A power supply unit 110 comprises a positive power supply 111 for applying a positive potential to the D electrode, a negative power supply 112 for applying a negative potential to the D electrode, and a switch 113 for switching these power supplies. The switch 113 is controlled to be connected to the negative power supply 112 on the refresh side in the refresh mode, and to be connected to the positive power supply 111 on the read side in the photoelectric conversion mode.

Figure 5A:
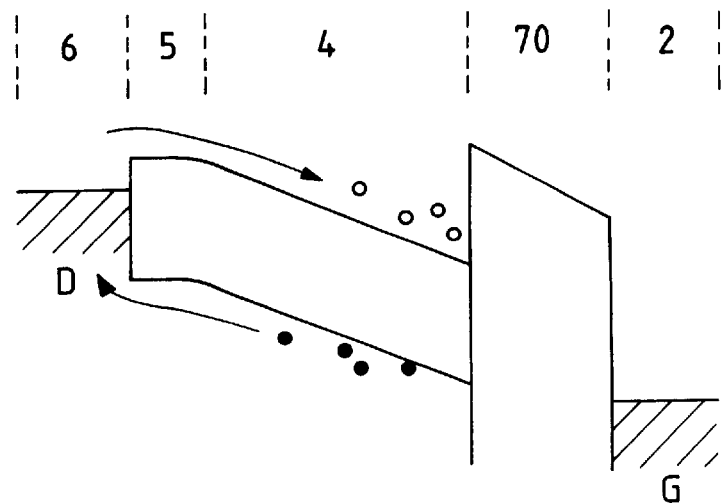
FIGS. 5A, 5B and 5C are energy band diagrams for explaining the energy states of the photoelectric conversion element.
Figure 5B:
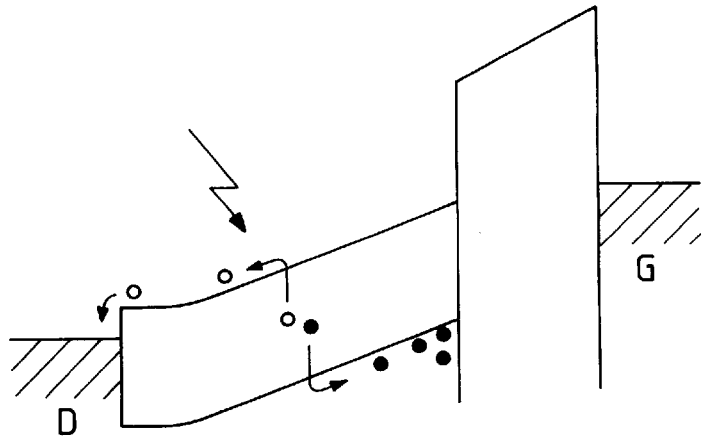

The operation of the photoelectric conversion element 100 will be described below. FIGS. 5A and 5B are energy band diagrams respectively showing the operation states in the refresh and photoelectric conversion modes of the photoelectric conversion element 100, and illustrate the states, in the direction of thickness of the individual layers, of the photoelectric conversion element.

In the refresh mode (a) shown in FIG. 5A, since the D electrode is applied with a negative potential with respect to the G electrode, the holes indicated by full circles in the i-layer 4 flow toward the D electrode in the presence of an electric field. At the same time, the electrons indicated by open circles are injected into the i-layer 4. At this time, some holes and electrons recombine in the n-layer 5 and the i-layer 4 and disappear. If this state continues for a sufficiently long period of time, the holes in the i-layer 4 are wiped out from the i-layer 4.

In this state, when the photoelectric conversion mode (b) shown in FIG. 5B is set, since a positive potential is applied to the D electrode with respect to the G electrode, the electrons in the i-layer 4 instantaneously flow to the D electrode. However, since the n-layer 5 serves as an injection blocking la y er, holes never flow to the i-layer 4. In this state, when light enters the i-layer 4, the light is absorbed to generate electron-hole pairs. These electrons flow to the D electrode, and the holes move inside the i-layer 4 and reach the interface between the i-layer 4 and the insulating layer 70. However, since holes cannot move into the insulating layer 70, they stay in the i-layer 4. At this time, since the electrons move into the D electrode, and the holes move to the interface with the insulating layer 70 in the i-layer 4, a current flows from the G electrode to the detection unit 120 to maintain an electrically neutral state in the element. Since this current corresponds to the amount of electron-hole pairs produced by light, it is proportional to the incident light amount.

After the photoelectric conversion mode (b) is maintained for a predetermined period, when the element is switched to the refresh mode state (a) again, the holes staying in the i-layer 4 flow to the D electrode, as described above, and a charge corresponding to these holes flows to the detection unit 120. The amount of holes corresponds to the total amount of light that is incident during the photoelectric conversion mode period, and the charge corresponds to the total amount of light. At this time, although a charge that corresponds to the amount of electrons injected into the i-layer 4 also flows, the amount of such electrons is nearly constant and can be subtracted from the amount of holes to detect the light amount.

Figure 5C:
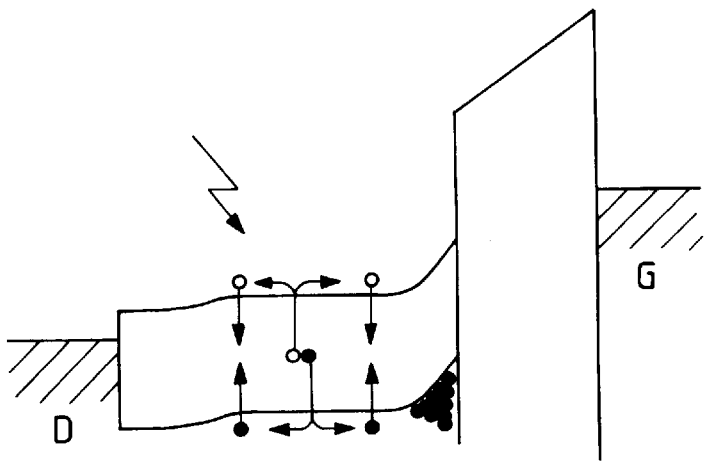

More specifically, the photoelectric conversion element 100 can output the incident light amount in real time, and at the same time, can output the total amount of light that is incident in a given period. This fact is the major feature of the example of the arrangement previously proposed by the present inventors. The detection unit 120 can detect flow of one or both of electrons and holes according to its objective. As will be described later, FIG. 5C shows the state a given period of time after the state in FIG. 5B when the illuminance of incident light is high.

The operation of the photoelectric conversion device previously proposed by the present inventors will be described below with reference to FIG. 6.

Figure 6:
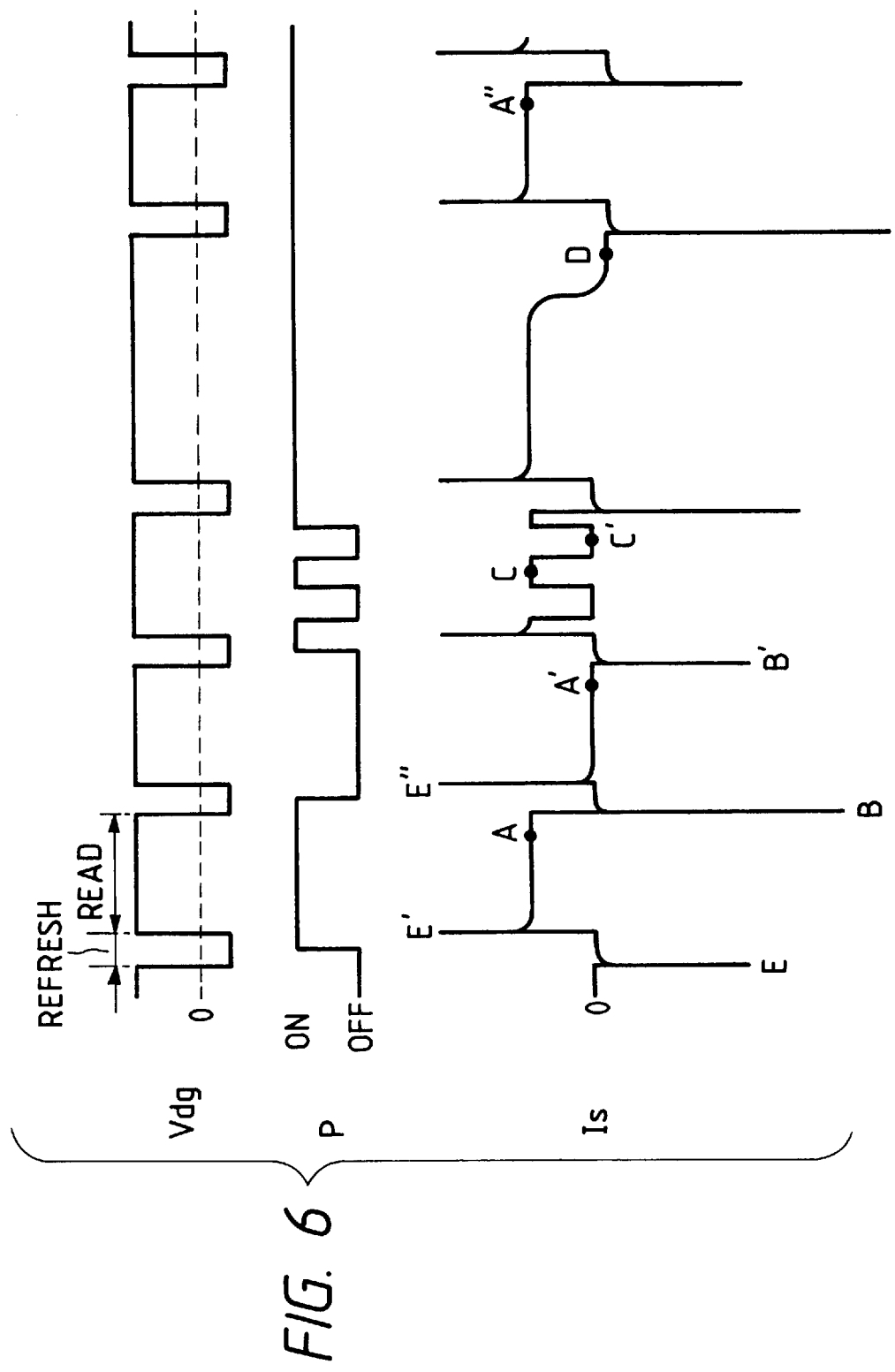
FIG. 6 is a timing chart for explaining an example of driving of a photoelectric conversion device.

FIG. 6 is a timing chart for explaining an example of the operation in the photoelectric conversion device shown in FIGS. 4A and 4B. In FIG. 6, a waveform Vdg represents the potential of the D electrode with respect to the D electrode in the photoelectric conversion element 100, and a waveform P represents the state of incidence of light. When the waveform P is ON, it indicates the light incident state; when it is OFF, no light is incident, i.e., it represents the dark state. A waveform IS represents the current that flows into the detection unit 120, and the abscissa plots the elapsed time.

Initially, when the switch 113 is connected to the refresh side, the refresh mode is started, and the potential Vdg becomes a negative voltage. In this case, as shown in FIG. 5A, since the holes are wiped out and the electrons are injected into the i-layer 4, a negative inrush current E flows through the detection unit 120, as shown in FIG. 6. Thereafter, when the refresh mode ends and the switch 113 is connected to the read side, the electrons in the i-layer 4 are wiped out, and a positive inrush current E' flows, thus starting the photoelectric conversion mode. At this time, if light enters, a photocurrent A flows, as shown in FIG. 6. On the other hand, in the dark state after a similar operation, no current flows, as indicated by A' in FIG. 6. Therefore, when the photocurrent A is detected directly or is integrated for a predetermined period of time, the incidence of light can be detected.

On the other hand, in the state A, when the switch 113 is connected to the refresh side, an inrush current B flows. This current represents the amount which is reflected in the total amount of incident light during the immediately preceding photoelectric conversion mode period, and an integral value or equivalent of the inrush current B need only be obtained. If no light enters in the immediately preceding photoelectric conversion mode, the inrush current becomes small, as indicated by B' in FIG. 6, and when the difference between the currents B and B' is detected, the incident of light can be detected. Also, since the above-mentioned inrush current E' or E" is nearly equal to the inrush current B', the current E or E" may be subtracted from the inrush current B.

Furthermore, even during the photoelectric conversion mode period, if the incident state of light has changed, the current IS changes, as indicated by C or C' in FIG. 6. If such changes are detected, the incident state of light can also be detected. That is, this means that the refresh mode need not be set for each detection timing. However, when the photoelectric conversion period is prolonged for some reason or when incident light has a strong illuminance, often no current flows although light is incident, as indicated by D in FIG. 6. Such phenomenon occurs for the following reason.

That is, as shown in FIG. 5C, a large number of holes stay in the i-layer 4, these holes reduce the electric field in the i-layer 4, and the produced electrons do not flow to the D electrode but recombine with the holes in the i-layer 4. When the incident state of light changes in this state, a current flows unstably, but when the refresh mode is set again, the holes in the i-layer 4 are wiped out, and a current equal to A can be obtained in the next photoelectric conversion mode, as indicated by A" in FIG. 6.

In the above description, the incident light is constant. However, the currents A, B, and C change continuously depending on the intensity of the incident light, and the intensity of light can be quantitatively detected irrespective of detection of the presence/absence of the incident light.

Also, in the above description, when the holes in the i-layer 4 are wiped out in the refresh mode, it is ideal to wipe out all the holes, but it is effective to wipe out only some holes. In this case, a current value obtained in this case remains the same as that obtained when all the holes are wiped out in the photocurrent A or C, and no serious problem is posed. That is, the current value need only be prevented from being in the state D, i.e., the state shown in FIG. 5C at the detection timing in the next photoelectric conversion mode, and the voltage Vdg in the refresh mode, the duration of the refresh mode, and the characteristics of the injection blocking layer of the n-layer 5 can be determined to avoid such state.

Furthermore, in the refresh mode, injection of electrons into the i-layer 4 is not a necessary condition, and the voltage Vdg is not limited to a negative voltage. That is, some holes need only be wiped out from the i-layer 4. When a large number of holes stay in the i-layer 4, the electric field in the i-layer 4 acts in a direction to flow the holes toward the D electrode even when Vdg is a positive voltage. It is not a necessary condition for the characteristics of the injection blocking layer of the n-layer 5, either, that it be capable of injecting electrons into the i-layer 4.

FIGS. 7A, 7B, 7C and 7D are respectively schematic circuit diagrams showing examples of the detection unit. FIGS. 7A, 7B, 7C and 7D illustrate an ammeter 121 represented by a current amplifier, a voltmeter 122, a resistor 123, a capacitor 124, a switch element 125, and an operational amplifier 126.

Figure 7A:
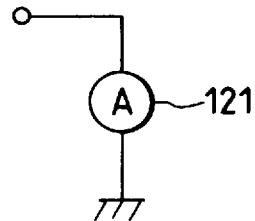
FIGS. 7A, 7B, 7C and 7D are schematic circuit diagrams for explaining examples of the arrangement of a detection unit.
Figure 7B:
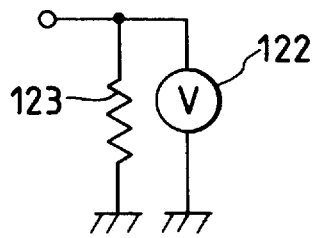
Figure 7C:
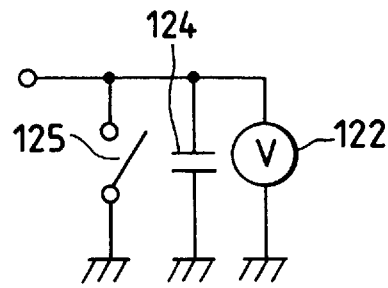
Figure 7D:
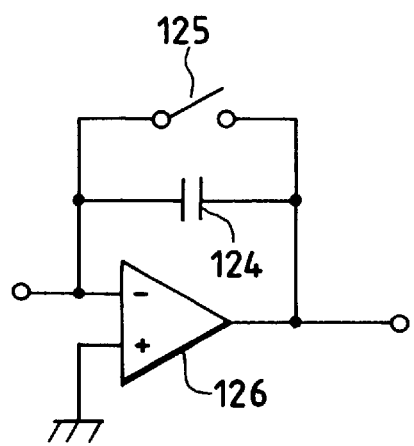

The detection unit shown in FIG. 7A directly detects current, and the output from the ammeter 121 corresponds to a voltage or amplified current. In the detection unit shown in FIG. 7B, a current is supplied to the resistor 123, and the voltmeter 122 detects voltage. In the detection unit shown in FIG. 7C, a charge is accumulated in the capacitor 124, and the voltage in the capacitor 124 is detected by the voltmeter 122. In the detection unit shown in FIG. 7D, the operational amplifier 126 detects the integral value of a current as a voltage. In FIGS. 7C and 7D, the switch element 125 has a role of giving an initial value to each detection, and may be replaced by a resistor with a high resistance depending on the detection methods.

The ammeter or voltmeter may be constituted by transistors, an operational amplifier as a combination of the transistors, a resistor, a capacitor, and the like, and a high-speed device may be used. The detection unit is not limited to these four arrangements, and may be constituted to concurrently or sequentially output the signals from a plurality of photoelectric conversion elements by combining a detector for detecting the current or voltage value, resistor, capacitor, and switch element, as long as it can detect the current or voltage value directly or its integral value.

Upon obtaining a line sensor or area sensor, the detection unit controls the potentials of, e.g., 1,000 or more photoelectric conversion elements in a matrix as a combination with interconnects and switch elements of the power supply unit, and detects the potentials to output them as electrical signals. In this case, it is advantageous to form some of the switch elements, capacitors, and resistors on a single substrate together with the photoelectric conversion elements in terms of the S/N ratio and cost. In this case, since the photoelectric conversion element in the example of the arrangement previously proposed by the present inventors has the same layer structure as that of a TFT as a typical switch element, these elements can be simultaneously formed in a single process, and a photoelectric conversion device with a high S/N ratio can be realized with low cost.

Variations in characteristics of the photoelectric conversion device depending on the refresh voltage values in the refresh mode will be explained below using a photoelectric conversion device previously proposed by the present inventors.

Figure 8:
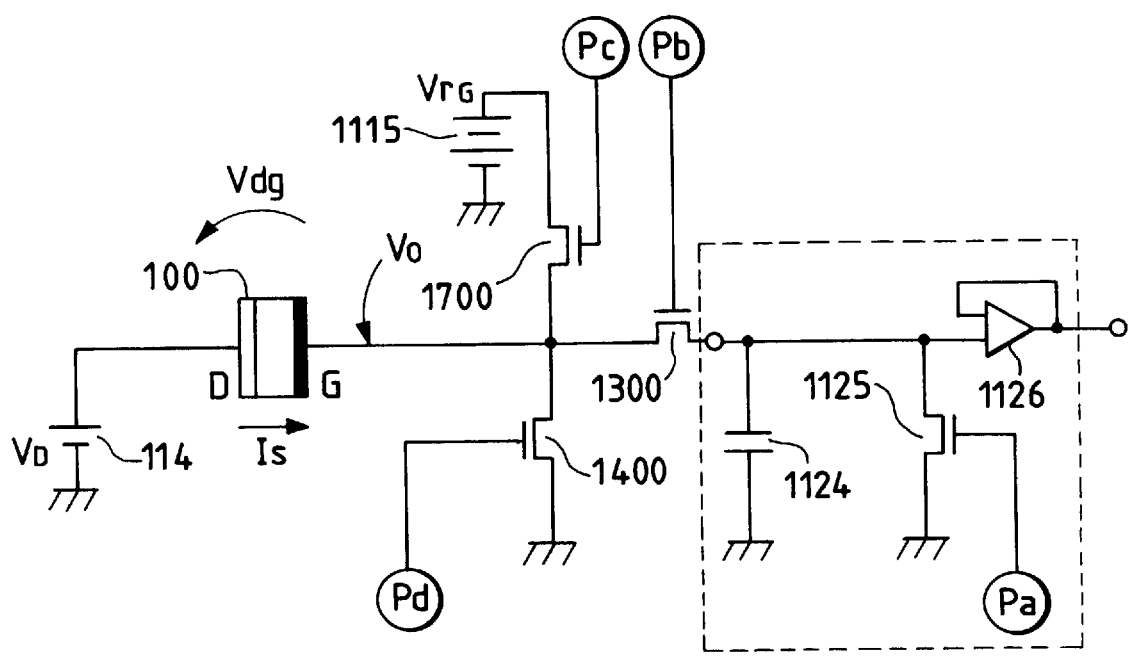
FIG. 8 is a schematic circuit diagram of a photoelectric conversion device.
Figure 9:
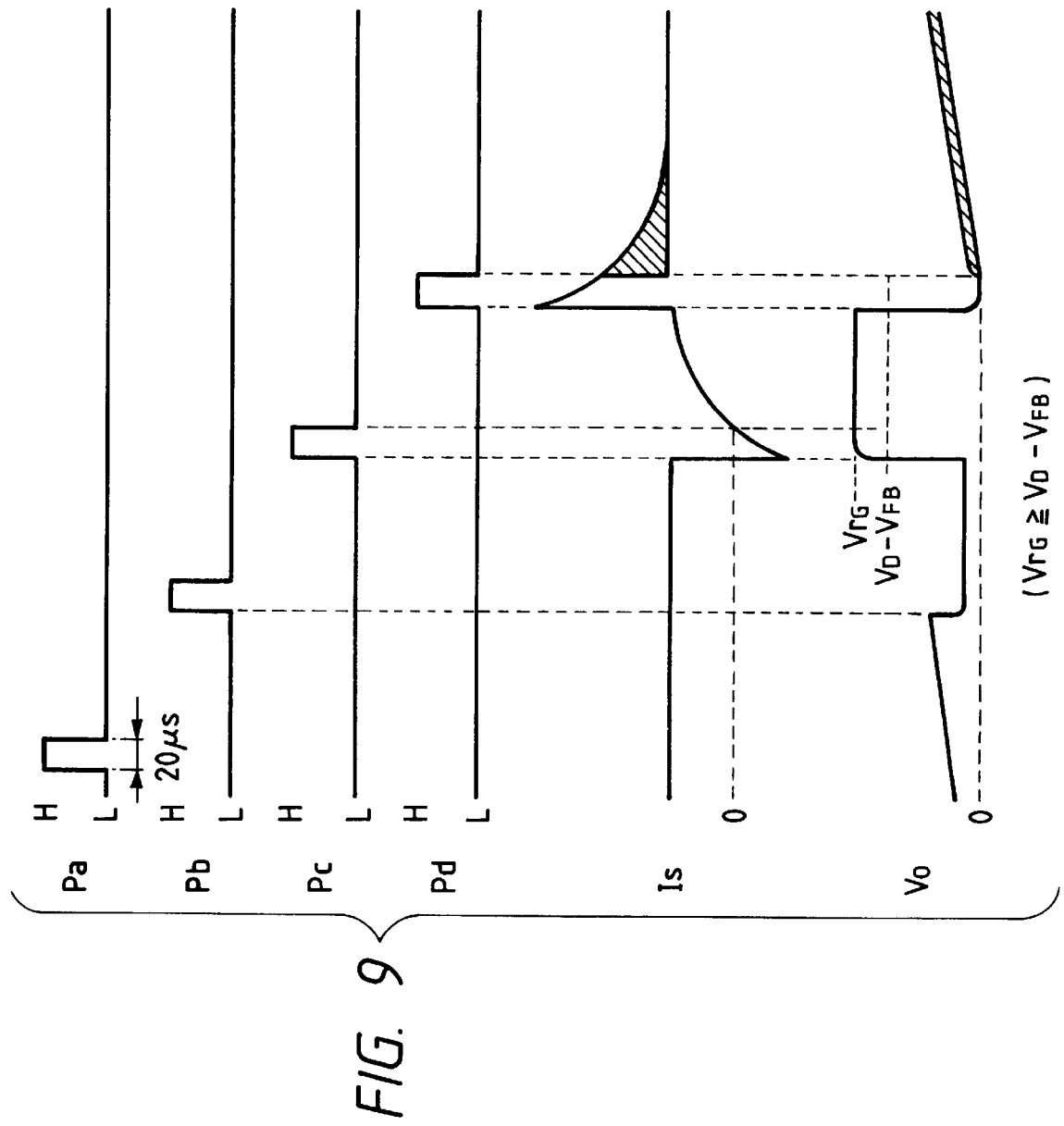
FIG. 9 is a timing chart for explaining an example of driving of the photoelectric conversion device.

FIG. 8 is a schematic equivalent circuit diagram of a 1-bit circuit of a photoelectric conversion device constituted by a TFT 1700 and a power supply 1115, and FIG. 9 is a timing chart showing an example of the operation of the device.

The following explanation will be given using the equivalent circuit diagram of the 1-bit circuit of the photoelectric conversion device shown in FIG. 8 in the refresh mode in which a positive potential is applied to the G electrode of the photoelectric conversion element 100 via the TFT 1700. Assume that the potential of the D electrode of the photoelectric conversion element 100 is set at $V_D$ by a power supply 114, and the potential of the G electrode in the refresh operation is set at $V_{rG}$ by the power supply 1115.

A case will be explained below wherein the potential ($V_0$) of the G electrode of the photoelectric conversion element 100 is refreshed to a voltage equal to or higher than the potential ($V_D$) of the D electrode, as shown in FIG. 5A. When the element is refreshed to this state, all of holes that have stayed in the i-layer 4 of the photoelectric conversion element 100 and holes that have been trapped by the interface defect present at the interface between the i-layer 4 and the insulating layer 70 are completely wiped out to the D electrode. Conversely, electrons flow from the D electrode into the i-layer 4 at that time, and some of them are trapped by the interface defect present at the interface between the i-layer 4 and the insulating layer 70. Such current will be referred to as a negative inrush current B or B' hereinafter. Upon completion of the refresh operation, when the potential of the G electrode of the photoelectric conversion element 100 is initialized to, e.g., the GND potential, all the electrons in the i-layer 4 and those trapped by the interface defect are wiped out to the D electrode. Such current will be referred to as a positive inrush current E or E' hereinafter. Since the interface defect present at the interface between the i-layer 4 and the insulating layer 70 normally has a deep energy level, energy for moving electrons and holes present at the interface defect position and energy for moving electrons and holes from another position to the interface defect position are relatively high, and the apparent mobility becomes low. For this reason, several ten usec to several sec are required until the positive inrush current becomes zero, i.e., until all the electrons trapped by the interface defect are wiped out to the D electrode. For this reason, even after the G electrode reset operation is complete, a large inrush current flows. As a result, charges accumulated in the capacitance of the G electrode include those produced by the inrush current as noise components, and consequently, the S/N ratio lowers by such charges.

The reason for the above-mentioned problem will be explained in detail below with reference to FIGS. 8 and 9. In FIG. 8, Pa, Pb, Pc, and Pd indicate the timings of pulses for respectively driving a switch element 1125, a transfer TFT 1300, the refresh TFT 1700, and a reset TFT 1400 in FIG. 8. Note that H indicates High level at which each driving element is set in the ON state and normally uses a voltage falling within the range from +5 V to +12 V for a crystalline silicon semiconductor switch element; a voltage falling within the range from +8 V to +15 V for an a-Si TFT. Also, L normally uses 0 V. Is and $V_0$ respectively indicate a current that flows in the direction of an arrow in FIG. 8 and the potential of the G electrode in a state wherein constant signal light is irradiated onto each photoelectric conversion element 100, as indicated by arrows in FIG. 8. FIG. 9 shows the current Is and the potential $V_0$ obtained when the pulse widths of the pulses Pa to Pd are 20 $\mu$s.

In FIG. 9, the G electrode potential $V_0$ of the photoelectric conversion element 100 is maintained at a constant high potential during the interval from the leading edge of the refresh pulse Pc to the leading edge of the reset pulse Pd. For this reason, no positive inrush current is produced during this interval, and a positive inrush current which may be produced upon clearing electrons trapped by the interface defect is produced for the first time in response to the leading edge of the pulse Pd. Since, for example, about 80 to 100 $\mu$sec are required until this positive inrush current attenuates and becomes nearly zero, a large positive inrush current has already been produced at the trailing edge of the pulse Pd at which a signal charge begins to be accumulated in the capacitance of the G electrode, and the charge and the voltage value in the portion indicated by hatching in FIG. 9 are accumulated as noise components. As a result, the S/N ratio lowers by the accumulated amount. As a method of reducing the positive inrush current, the pulse width of the reset pulse Pd may be increased. However, the increase in pulse width is limited. Also, when the pulse width is increased, the signal reading time of the entire device is prolonged, resulting in a low reading speed of the device.

Figure 10A:
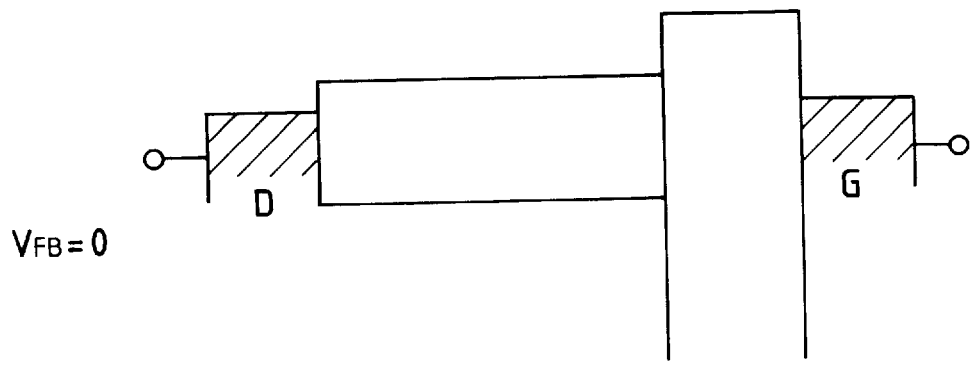
FIGS. 10A, 10B, 10C, 11A, 11B and 11C are energy band diagrams for explaining the energy states of the photoelectric conversion element.
Figure 10B:
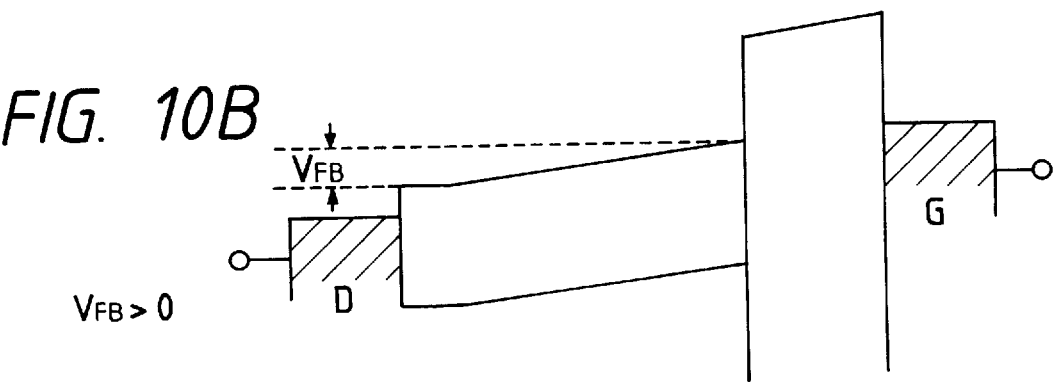
Figure 10C:
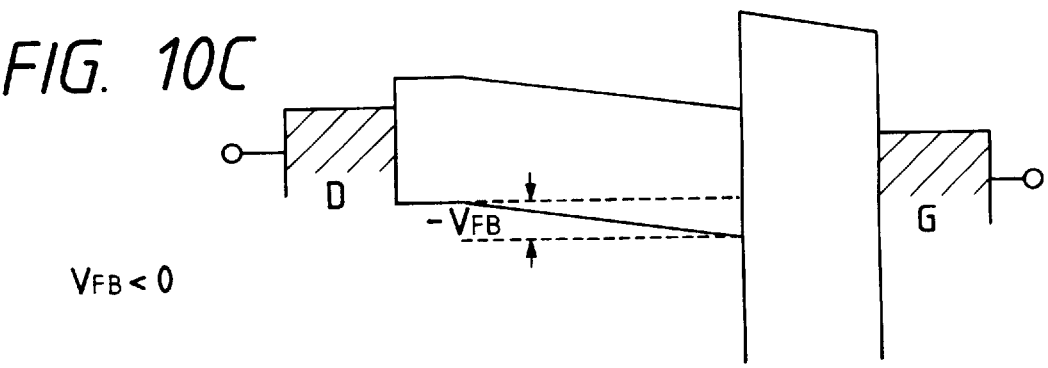

The conditions for the applied voltage upon refreshing the photoelectric conversion element 100 will be explained below with reference to FIGS. 10A, 10B and 10C. FIGS. 10A, 10B and 10C are energy band diagrams of the photoelectric conversion element 100, and the individual electrodes (D and G electrodes) at the two ends are in the open state. The photoelectric conversion element 100 has a so-called MIS (Metal-Insulator-Semiconductor) structure, and a state with a relatively small total capacitance (depletion state) and a state with a relatively large total capacitance (accumulation state) appear depending on the conditions of the voltage applied across the two electrodes.

Although the two ends of each of the devices shown in FIGS. 10A to 10C are open, as for the energy band diagrams, FIG. 10B is the same as the energy band diagram in the depletion state, and FIG. 10C is the same as the energy band diagram in the accumulation state.

In general, immediately after the manufacture a MIS capacitor is often in the state shown in FIG. 10A, i.e., in a state wherein the band of an i-layer is flat (a flat-band voltage $V_{FB}$=0 V), or in the state shown in FIG. 10B, i.e., in a slightly depleted state (3 V; $V_{FB}$>0 V). By applying a voltage across the two ends of the MIS capacitor, the voltage $V_{FB}$ may be controlled to an arbitrary positive or negative value to some extent.

When the 1-bit circuit shown in FIG. 4B is driven at the timings shown in FIG. 6, the refresh time can become shorter than the photoelectric conversion time. When the photoelectric conversion elements are two-dimensionally arranged and are matrix-driven, the ratio between the refresh time and the photoelectric conversion time increases as the number of photoelectric conversion elements becomes larger.

It is generally known that the flat-band voltage $V_{FB}$ of the MIS capacitor has a large dependence on the electric field, time, and temperature. In the photoelectric conversion element in the photoelectric conversion device of the present invention, the flat-band voltage $V_{FB}$ shifts in the positive direction in the refresh mode, and shifts in the negative direction in the photoelectric conversion mode.

Accordingly, in the photoelectric conversion element in the photoelectric conversion device shown in FIGS. 4A and 4B, the flat-band voltage $V_{FB}$ consequently shifts in the negative direction to narrow the dynamic range of the photoelectric conversion element. In this case, the S/N ratio of the photoelectric conversion devices lowers, and stable characteristics can no longer be obtained.

The conditions for the voltage value that results in a positive inrush current (having a long attenuation time and a large current value) will be summarized below. When the flat-band voltage $V_{FB}$ of the i-layer of the photoelectric conversion element 100 is zero, if the potential ($V_{rG}$) of the G electrode in the refresh mode is higher than the potential ($V_D$) of the D electrode, i.e., if $V_{rG} > V_D$, the above-mentioned positive inrush current in question flows.

On the other hand, when the flat-band voltage $V_{FB}$ of the i-layer of the photoelectric conversion element 100 is not zero, if the potential ($V_{rG}$) of the G electrode in the refresh mode is higher than the voltage value obtained by subtracting $V_{FB}$ from the potential ($V_D$) of the D electrode, i.e., if $V_{rG} \geq V_D - V_{FB}$, the above-mentioned positive inrush current in question flows.

Figure 11A:
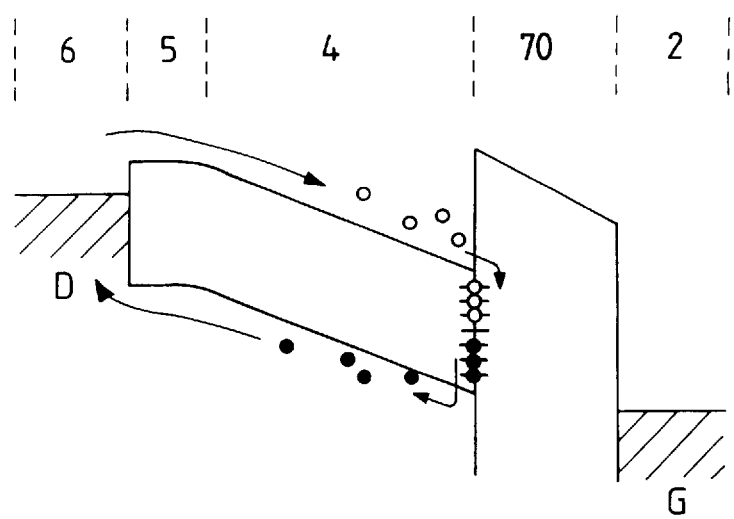
Figure 11B:
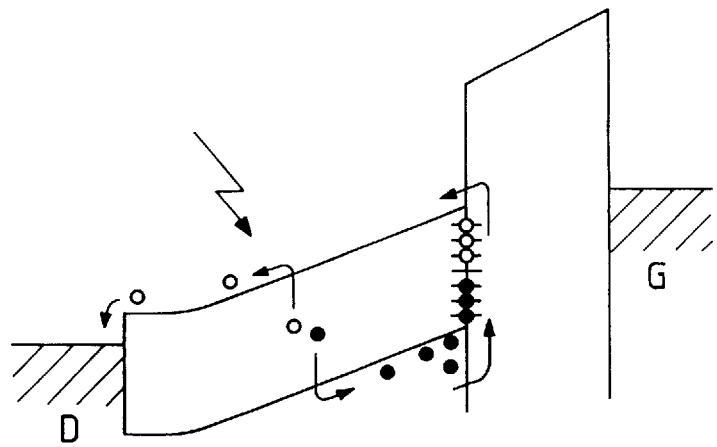
Figure 11C:
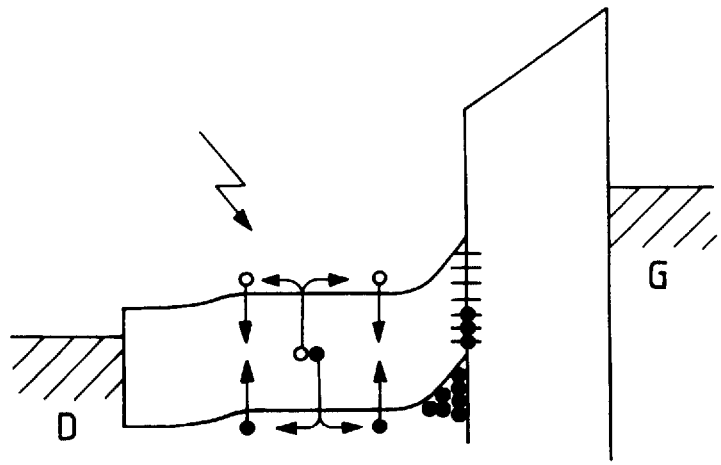

This mechanism will be explained below with reference to FIGS. 11A, 11B and 11C. FIGS. 11A, 11B and 11C are energy band diagrams of the photoelectric conversion element 100 when $V_{rG} \geq V_D - V_{FB}$, and illustrate the states in the direction of thickness, of the individual layers from the lower electrode 2 to the transparent electrode 6 in FIG. 11A. In FIG. 11A that shows the refresh operation, since the D electrode is applied with a negative potential with respect to the G electrode, the holes indicated by full circles in the i-layer 4 flow toward the D electrode in the presence of the electric field. At the same time, the electrons indicated by open circles are injected into the i-layer 4. The holes trapped by the interface defect between the i-layer 4 and the insulating layer 70 flow toward the D electrode while expending certain time, and conversely, some electrons injected into the i-layer 4 are trapped by the interface defect between the i-layer 4 and the insulating layer 70 while expending certain time. At this time, some holes and electrons recombine and disappear in the n-layer 5 and the i-layer 4. If this state continues for a sufficiently long period of time, the holes in the i-layer 4 are wiped out from the i-layer 4.

When the photoelectric conversion operation (FIG. 11B) starts in this state, since the D electrode is applied with a positive potential with respect to the G electrode, the electrons in the i-layer 4 instantaneously flow toward the D electrode. The electrons in the i-layer 4 and those trapped by the interface defect flow toward the D electrode while spending certain time. The electrons trapped by the interface defect are a cause of the above-mentioned inrush current in question. In this case, holes never flow toward the i-layer since the n-layer 5 serves as an injection blocking layer.

When light enters the i-layer 4 in this state, light is absorbed and electron-hole pairs are produced. These electrons flow toward the D electrode in the presence of the electric field, and the holes move inside the i-layer 4 and reach the interface between the i-layer 4 and the insulating layer 70. However, since the holes cannot move into the insulating layer 70, they stay in the i-layer 4. FIG. 11C shows the state after the state in FIG. 11B in the photoelectric conversion operation is maintained for a predetermined period of time.

The dynamic range (D·R) of the photoelectric conversion element 100 under such refresh conditions will be explained below. If the D·R of the photoelectric conversion element 100 shown in FIG. 8 is expressed as a charge amount, it is given by $D \cdot R = V_{rG} \times C_s$ (where $C_s$ is the capacitance of the photoelectric conversion element 100). Therefore, the dynamic range (D·R) of the photoelectric conversion element 100 broadens more as the refresh voltage $V_{rG}$ becomes higher. For this reason, when the signal light irradiated onto the photoelectric conversion element 100 is strong, a large signal amount due to light can be obtained and, hence, the S/N ratio can be improved.

A case will be explained below wherein a refresh is made to a potential equal to or lower than the potential ($V_0$) of the G electrode of the photoelectric conversion element 100 ($V_{rG} < V_D - V_{FB}$)

Figure 12:
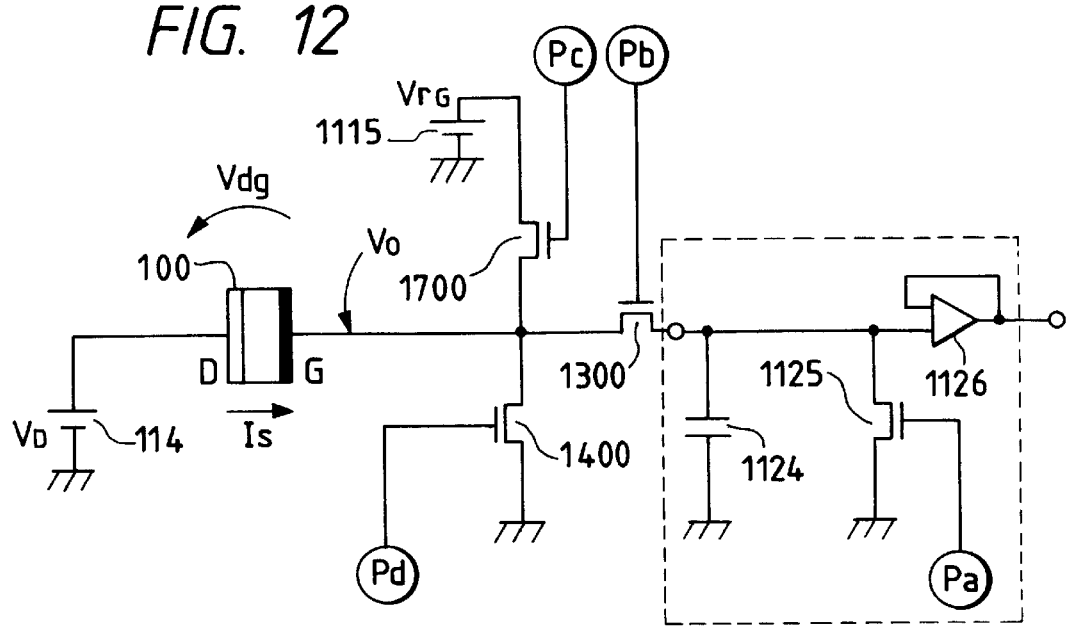
FIG. 12 is a schematic circuit diagram of a photoelectric conversion device.
Figure 13:
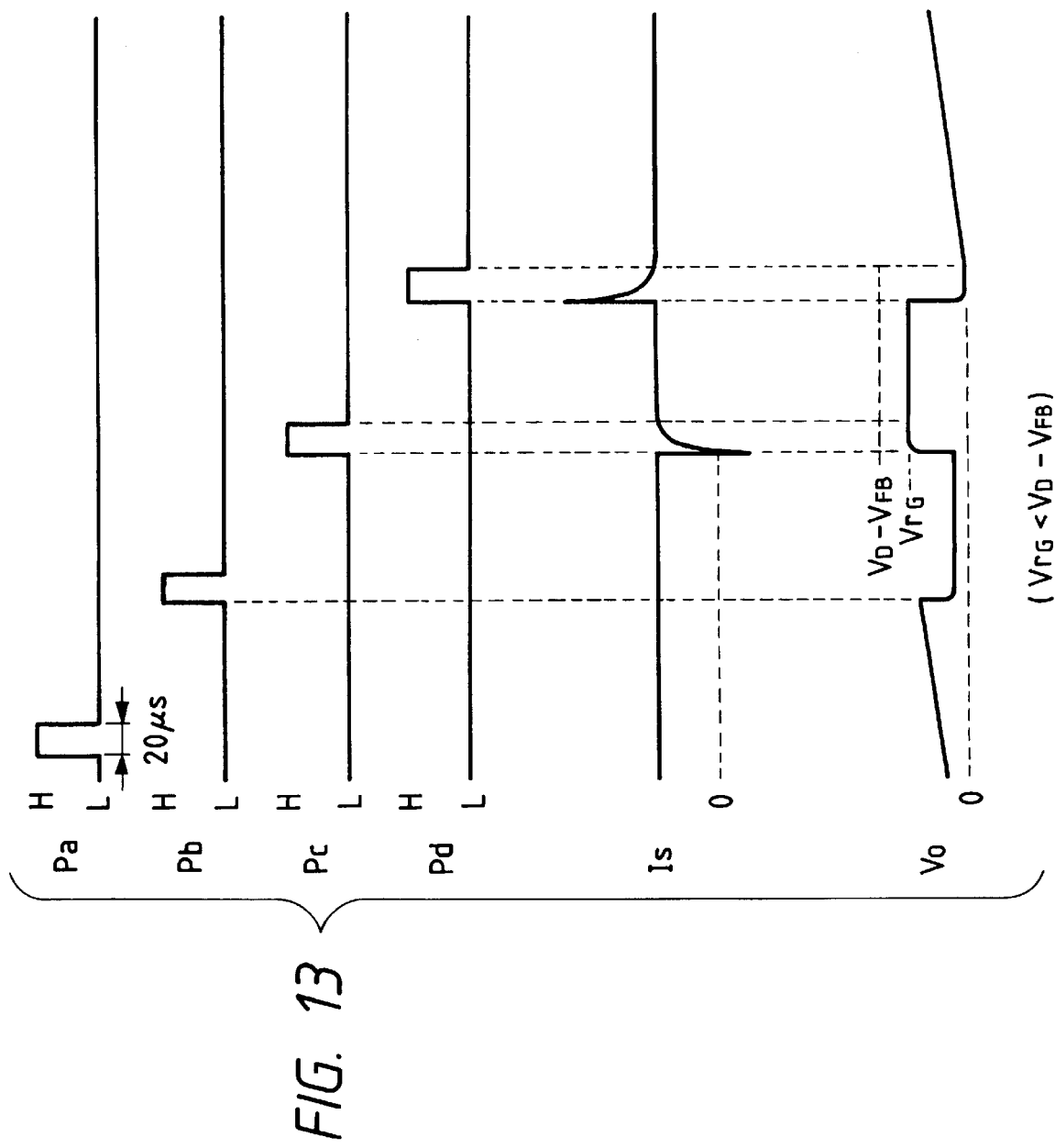
FIG. 13 is a timing chart for explaining an example of driving of the photoelectric conversion device.

FIG. 12 is a schematic equivalent circuit diagram of a 1-bit circuit of the photoelectric conversion device. FIG. 13 is a timing chart upon actually driving the photoelectric conversion device shown in FIG. 12.

Since the same reference numerals in FIG. 12 denote the same parts as in FIG. 8, a detailed description thereof will be omitted. The difference between the schematic equivalent circuits shown in FIGS. 8 and 12 is the power of the power supply 1115 connected to the TFT 1700. Since the photoelectric conversion element 100 has the same structure as that shown in FIG. 4A, the injection blocking layer between the i-layer and the second electrode layer is of n-type, and the carriers to be injection-blocked are holes. For this reason, if q represents the charge per carrier to be injection-blocked, q>0 holds in this case as well.

In FIG. 12, a signal detection unit includes a detection means surrounded by a dotted line in FIG. 12, the TFT 1300, and a means for applying a high-level pulse Pb.

Only the difference between FIGS. 12 and 8 is that the potential $V_{rG}$ of the power supply 1115 for applying a positive potential to the G electrode in the refresh operation of the photoelectric conversion element 100 is lower than the potential $V_D$ of the power supply 114 for applying a positive potential to the D electrode. More specifically, since the flat-band voltage ($V_{FB}$) is applied to the G electrode to make the energy band of the i-layer flat, the photoelectric conversion element 100 is driven in the state of $V_{rG} \geq V_D - V_{FB}$ in FIG. 8 in practice, while it is driven in the state of $V_{rG} < V_D - V_{FB}$ in FIG. 12.

The operation of the photoelectric conversion device in the state of $V_{rG} < V_D - V_{FB}$ will be explained with reference to FIG. 13. The difference between FIGS. 13 and 9 is the current IS of the photoelectric conversion element 100 and the behavior of the potential $V_0$ of the G electrode due to the current IS.

In FIG. 13, when the refresh pulse Pc changes to High level and the G electrode of the photoelectric conversion element 100 is applied with the voltage $V_{rG}$ ($V_{rG} < V_D - V_{FB}$), some of the holes staying in the i-layer are wiped out to the D electrode. At this time, it is speculated that most of all the holes trapped by the interface defect between the i-layer and the insulating layer remain unmoved. On the other hand, electrons corresponding in amount or less to some holes wiped out to the D electrode flow from the D electrode into the i-layer. However, since the electric field in the i-layer has a low potential at the G electrode side, the number of electrons trapped by the interface defect between the i-layer and the insulating layer is considered to be nearly zero. Therefore, the current IS in FIG. 13 produces only a small, negative inrush current at the leading edge of the refresh pulse Pc and the attenuation time of the inrush current is shortened. Also, as can be seen from FIG. 13, the voltage $V_0$ of the G electrode from the leading edge of the refresh pulse Pc to the leading edge of the G electrode reset pulse Pd substantially equals $V_{rG}$, and its potential is lower than $V_D - V_{FB}$.

When the G electrode reset pulse changes to High level and the G electrode of the photoelectric conversion element 100 is connected to GND, all of a few electrons staying in the i-layer flow into the D electrode. At this time, since no electrons are present at the interface defect between the i-layer and the insulating layer, it is assumed that a small amount of electrons flow out instantaneously and the holes present at the interface defect do not move. Therefore, at the leading edge of the G electrode reset pulse Pd, the current IS produces only a small, positive inrush current, and the attenuation time of the inrush current is shortened. If the interval between the leading and trailing edges of the G electrode reset pulse Pd is about 20 μsec, the inrush current becomes nearly zero at the trailing edge of the pulse Pd corresponding to the beginning of the photoelectric conversion operation, as shown in FIG. 13. Accordingly, most of all charges which begin to be accumulated from the leading edge of the pulse Pd correspond to those produced by signal light entering the photoelectric conversion element 100, and information with a high S/N ratio can be obtained by reading out the signal voltage.

The basic mechanism of the photoelectric conversion element used in the present invention will be described in detail below with reference to the accompanying drawings.

Figure 14A:
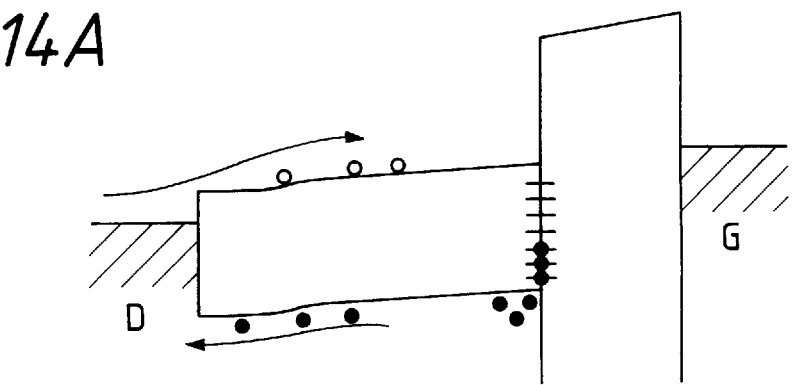
FIGS. 14A, 14B and 14C are energy band diagrams for explaining the energy states of the photoelectric conversion element.
Figure 14B:
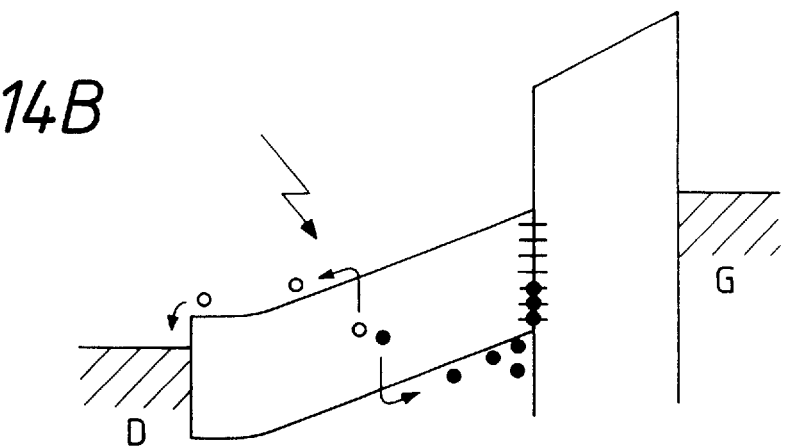
Figure 14C:
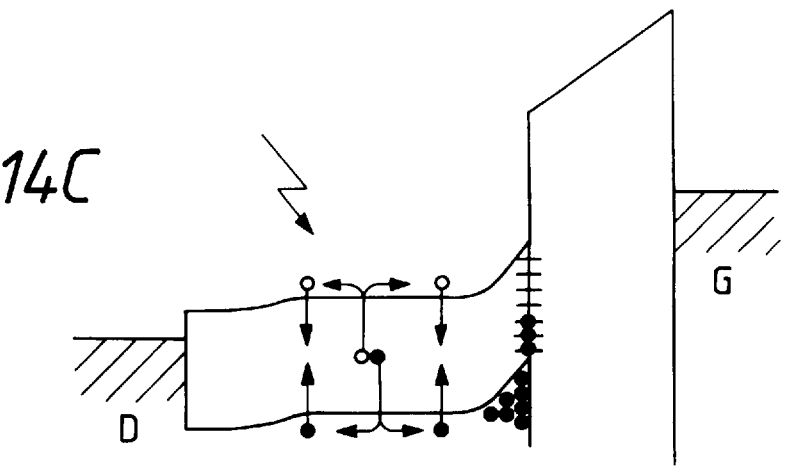

FIGS. 14A, 14B and 14C are energy band diagrams showing the operation of the photoelectric conversion element 100 when $V_{rG} < V_D - V_{FB}$, and correspond to those shown in FIGS. 11A, 11B and 11C.

In FIG. 14A that shows the refresh operation, since the D electrode is applied with a positive potential with respect to the G electrode, some of holes indicated by full circles in the i-layer 4 flow toward the D electrode in the presence of the electric field. At the same time, the electrons indicated by open circles are injected into the i-layer 4. Note that few holes trapped by the interface defect between the i-layer 4 and the insulating layer 70 move, and no electrons are trapped by the interface defect.

When the photoelectric conversion operation shown in FIG. 14B starts in this state, since the G electrode is applied with a still larger, negative potential with respect to the D electrode, the electrons in the i-layer 4 instantaneously flow toward the D electrode, but since few electrons trapped by the interface defect are present, the inrush current in question in the photoelectric conversion device shown in FIG. 8 becomes nearly zero.

After the photoelectric conversion operation (FIG. 14B) continues for a predetermined period of time, the state shown in FIG. 14C is obtained.

In this manner, when the refresh operation is made to satisfy the condition $V_{rG} < V_D - V_{FB}$, since few electrons are present at the interface defect between the i-layer 4 and the insulating layer 70, the electron movement does not require a long period of time, and consequently, the inrush current as noise components can be greatly reduced.

However, the dynamic range (D·R) of the photoelectric conversion element 100 shown in FIG. 12 under such refresh condition ($V_{rG} < V_D - V_{FB}$) becomes narrower than that obtained when $V_{rG} \geq V_D - V_{FB}$ since it is given by D·R=$V_{rG}$× Cs. For this reason, when the signal light is strong, charges produced by the signal light are saturated, thus lowering the S/N ratio.

Items to be considered to assure a high S/N ratio and stable characteristics in the photoelectric conversion device previously proposed by the present inventors will be explained again.

When the 1-bit circuit shown in FIG. 4B is driven at the timings shown in FIG. 6, the refresh time can become shorter than the photoelectric conversion time. When the photoelectric conversion elements are two-dimensionally arranged and are matrix-driven, the ratio between the refresh time and the photoelectric conversion time increases as the number of photoelectric conversion elements becomes larger.

It is generally known that the flat-band voltage $V_{FB}$ of a MIS capacitor has large dependence on the electric field, time, and temperature. In the photoelectric conversion element in the photoelectric conversion device of the present invention, the flat-band voltage $V_{FB}$ shifts in the positive direction in the refresh mode, and shifts in the negative direction in the photoelectric conversion mode.

Accordingly, in the photoelectric conversion element in the photoelectric conversion device shown in FIGS. 4A and 4B, the flat-band voltage $V_{FB}$ consequently shifts in the negative voltage direction to narrow the dynamic range of the photoelectric conversion element. In this case, the S/N ratio of the photoelectric conversion devices lowers, and stable characteristics can no longer be obtained.

In consideration of the above situation, the present invention will be described in detail hereinafter.

<First Embodiment>

Figure 15:
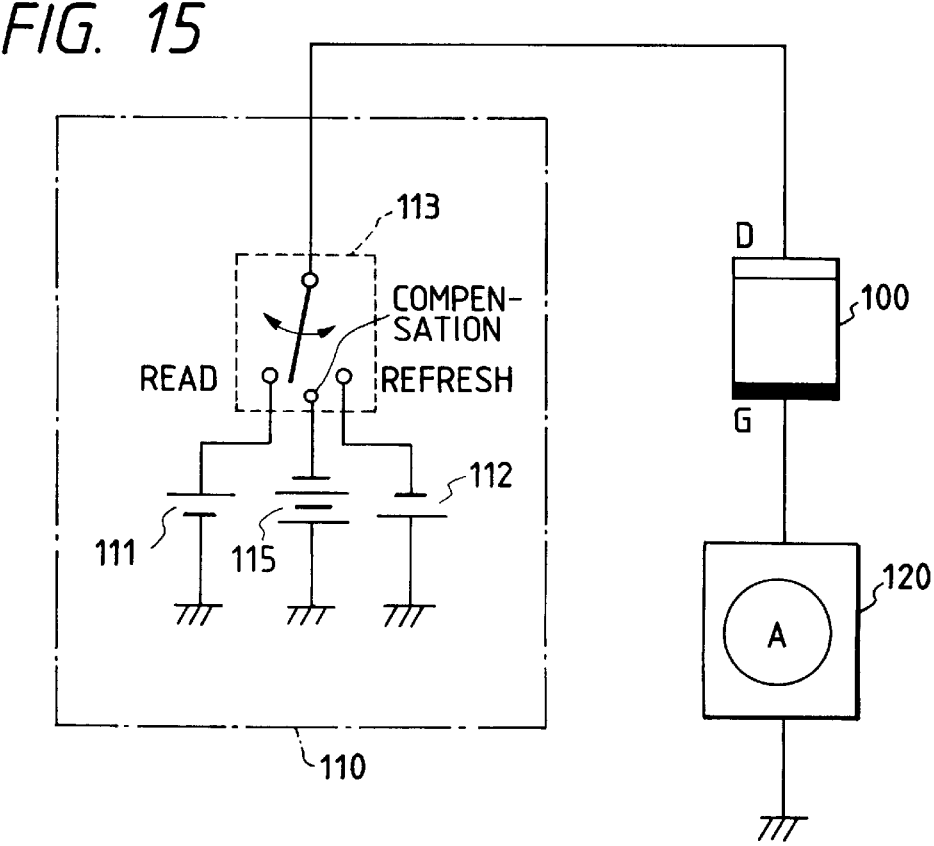
FIGS. 15 and 16 are schematic circuit diagrams of photoelectric conversion devices.

FIG. 15 is a schematic equivalent circuit diagram of a 1-bit circuit of an example of a photoelectric conversion device of the present invention. The same reference numerals in FIG. 15 denote the same parts as in FIG. 4B.

The difference from FIG. 4B is that a power supply 115 for compensating for shifts of the flat-band voltage ($V_{FB}$) of the photoelectric conversion element 100 is added to apply an electric field in a direction opposite to that in the photoelectric conversion mode of the photoelectric conversion element 100.

In FIG. 15, a power supply 111 applies a positive voltage to the D electrode of the photoelectric conversion element 100 in the photoelectric conversion mode to read out photoelectrically converted charges, a power supply applies a negative voltage to the D electrode in the refresh mode to remove residual charges which are accumulated in the photoelectric conversion element but are not read out. Thereafter, the power supply 115 applies a negative, large voltage to the D electrode in a flat-band voltage shift compensation mode to remove the residual charges in the photoelectric conversion element. In this manner, charges corresponding to the light amount can be accurately read out, and repetitive high-speed reading cycles can be attained within a short period of time, thus obtaining an image signal with a high S/N ratio. Note that the refresh power supply 112 of the D electrode of the photoelectric conversion element 100 is set at a negative value. Alternatively, for the purpose of reducing the inrush current, as described above, the refresh power supply 112 can be used as a positive value.

When the power supply 115 comprises a power supply that can apply a relatively large voltage, the flat-band voltage shift compensation time, i.e., the time for connecting the power supply 115 to the movable contact of the switch 113, can be relatively short, and the total driving time of the photoelectric conversion device can be shortened.

With this circuit, the photoelectric conversion element 100 can be driven while switching the photoelectric conversion mode (the state wherein the switch 113 is connected to the read side), the refresh mode (the state wherein the switch 113 is connected to the refresh side), and the flat-band voltage shift compensation mode (the state wherein the switch 113 is connected to the compensation side) in a given order, and shifts of the flat-band voltage described above can be restrained for. For this reason, the dynamic range of the sensor can be prevented from narrowing, and a high S/N ratio and stable characteristics can be assured.

In other words, the flat-band voltage shift compensation mode is an operation mode that can apply an electric field to the individual layers under the condition that the product $(V_{rG} \cdot q)$ of a voltage $(V_{rG})$ of a first electrode layer of the photoelectric conversion element and a charge (q) of a carrier of a first type is larger than the product $\{(V_D - V_{FB}) \cdot q\}$ of a voltage $(V_D - V_{FB})$ obtained by subtracting a flat-band voltage $(V_{FB})$ from a voltage $(V_D)$ of a second electrode layer, and the charge (q) of the carrier of the first type:

$$(V_{rG} \cdot q) \geq (V_D \cdot q - V_{FB} \cdot q)$$

More specifically, when the photoelectric conversion device is driven for a long period of time, i.e., in the photoelectric conversion mode, $(V_{rG} \cdot q) < (V_D \cdot q - V_{FB} \cdot q)$ holds, and the flat-band voltage of the photoelectric conversion elements shifts in the negative direction. In order to restrain this shift, in the present invention, the flat-band voltage shift compensation mode is set, and the state opposite to that described above, i.e., the state $(V_{rG} \cdot q) \geq (V_D \cdot q - V_{FB} \cdot q)$, is set to restrain the shift of the flat-band voltage, thus preventing the dynamic range from narrowing.

<Second Embodiment>

Figure 16:
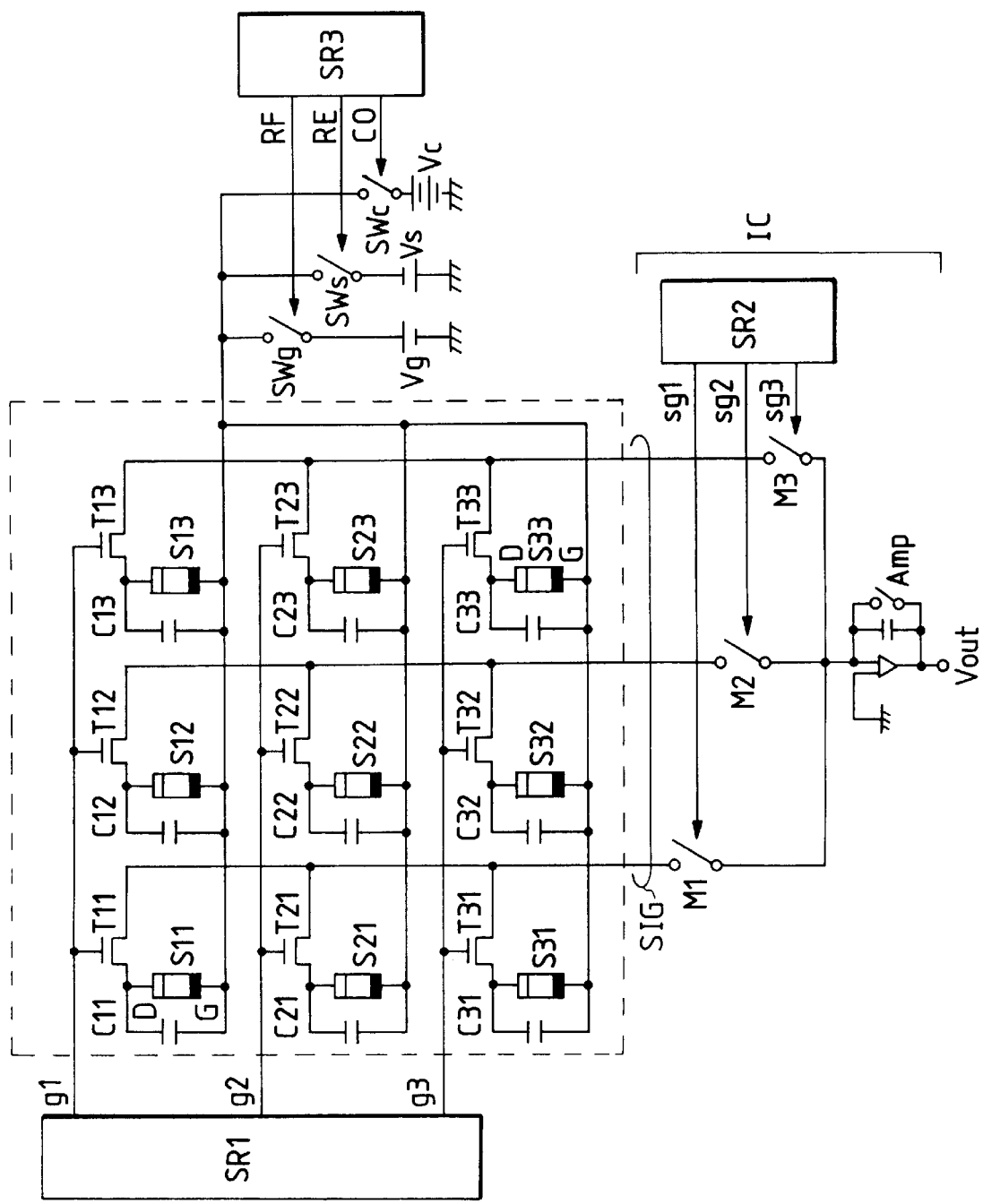
Figure 17A:
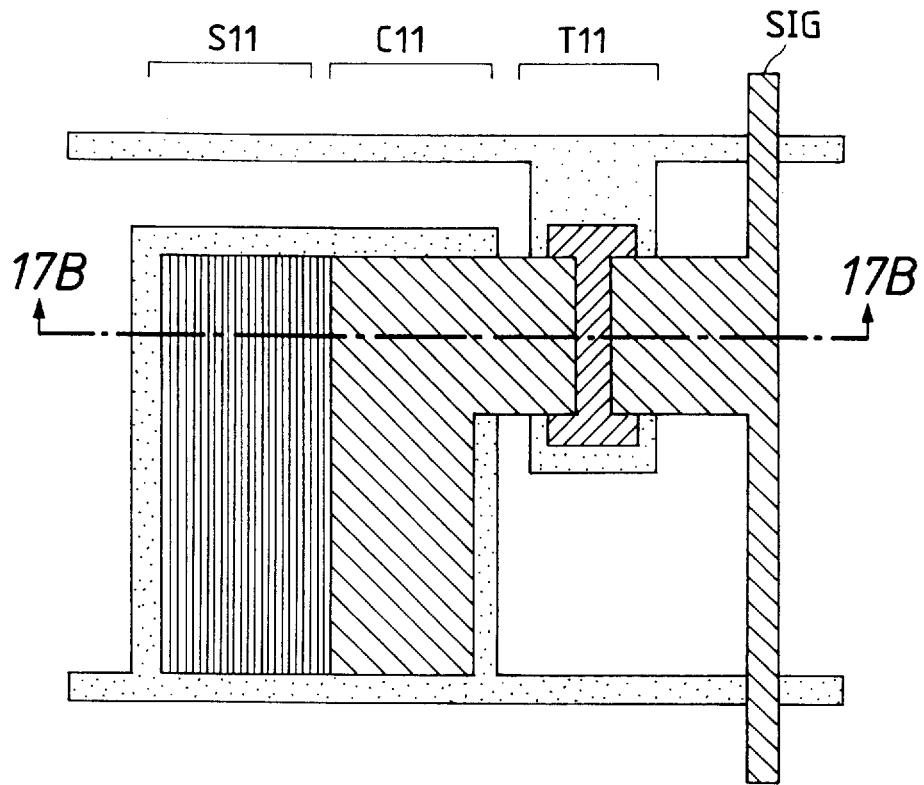
FIG. 17A is a schematic plan view of a pixel of a photoelectric conversion device.
Figure 17B:
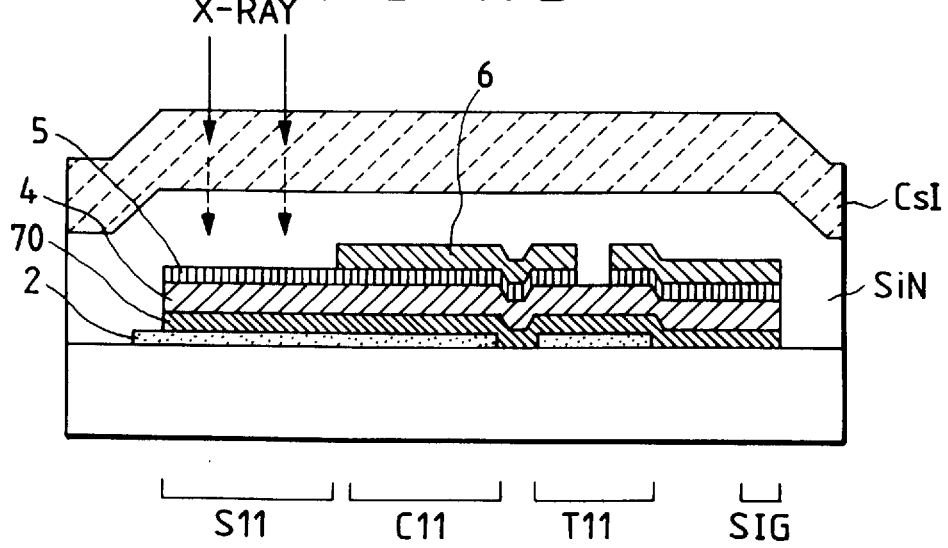
FIG. 17B is a schematic sectional view taken along a line 17B—17B in FIG. 17A.

FIG. 16 is a schematic circuit diagram showing another example of the overall photoelectric conversion device of the present invention. FIG. 17A is a plan view showing the individual elements corresponding to one pixel in the photoelectric conversion device, and FIG. 17B is a sectional view taken along a line 17B—17B in FIG. 17A.

Referring to FIG. 16, photoelectric conversion elements S11 to S33, the lower electrode side of which is indicated by G and the upper electrode side of which is indicated by D, are connected to transfer TFTs T11 to T33 via accumulation capacitors C11 to C33. A read power supply $V_s$, a refresh power supply $V_g$, and a flat-band voltage shift compensation power supply $V_c$ are respectively connected to the G electrodes of all the photoelectric conversion elements S11 to S33 via switches $SW_s$, $SW_g$, and $SW_c$. Note that the potentials of these power supplies to be applied to the G electrodes of the sensors are set to satisfy $V_c > V_g > 0 > V_s$. The switches $SW_s$, $SW_g$, and $SW_c$ are directly connected to a shift register SR3, and are controlled not to be turned on at the same time. The ON period of each switch can be arbitrarily set.

One pixel is constituted by one photoelectric conversion element, one capacitor, and one TFT, and its signal output is connected to a detection integrated circuit IC via a signal line SIG. In the photoelectric conversion device of this embodiment, a total of nine pixels are divided into three blocks. The outputs from three pixels per block are simultaneously transferred, and are sequentially converted into outputs by the detection integrated circuit IC via the signal lines SIG, thus obtaining outputs ($V_{out}$). Three pixels in one block are arranged in the horizontal direction, and the three blocks are arranged in the vertical direction, thus arranging pixels two-dimensionally.

A portion surrounded by a broken line in FIG. 16 is formed on a single, large-area insulating substrate. FIG. 17A is a plan view of a portion corresponding to the first pixel in the portion surrounded by the broken line, and FIG. 17B is a sectional view taken along a broken line 17B—17B in FIG. 17A. The first pixel includes the photoelectric conversion element S11, the TFT T11, the capacitor C11, and the signal line SIG. In this embodiment, the capacitor C11 and the photoelectric conversion element S11 are not independent: the capacitor C11 is formed by increasing the area of the electrodes of the photoelectric conversion element S11. Such structure can be realized since the photoelectric conversion element of this embodiment and the capacitor have the same layer structure. On the upper portion of the pixel, a passivation silicon nitride film (SiN) and a phosphor, e.g., cesium iodide (CsI) are formed. When X-rays are incident from above, they are converted into light components (broken arrows) by the phosphor (CsI), and these light components enter the photoelectric conversion element. The passivation material and the phosphor material are not limited to the above-mentioned specific materials, and other materials may be used as long as the functions of this embodiment can be provided.

The operation of the photoelectric conversion device of this embodiment will be explained below with reference to FIGS. 16 to 18.

Figure 18:
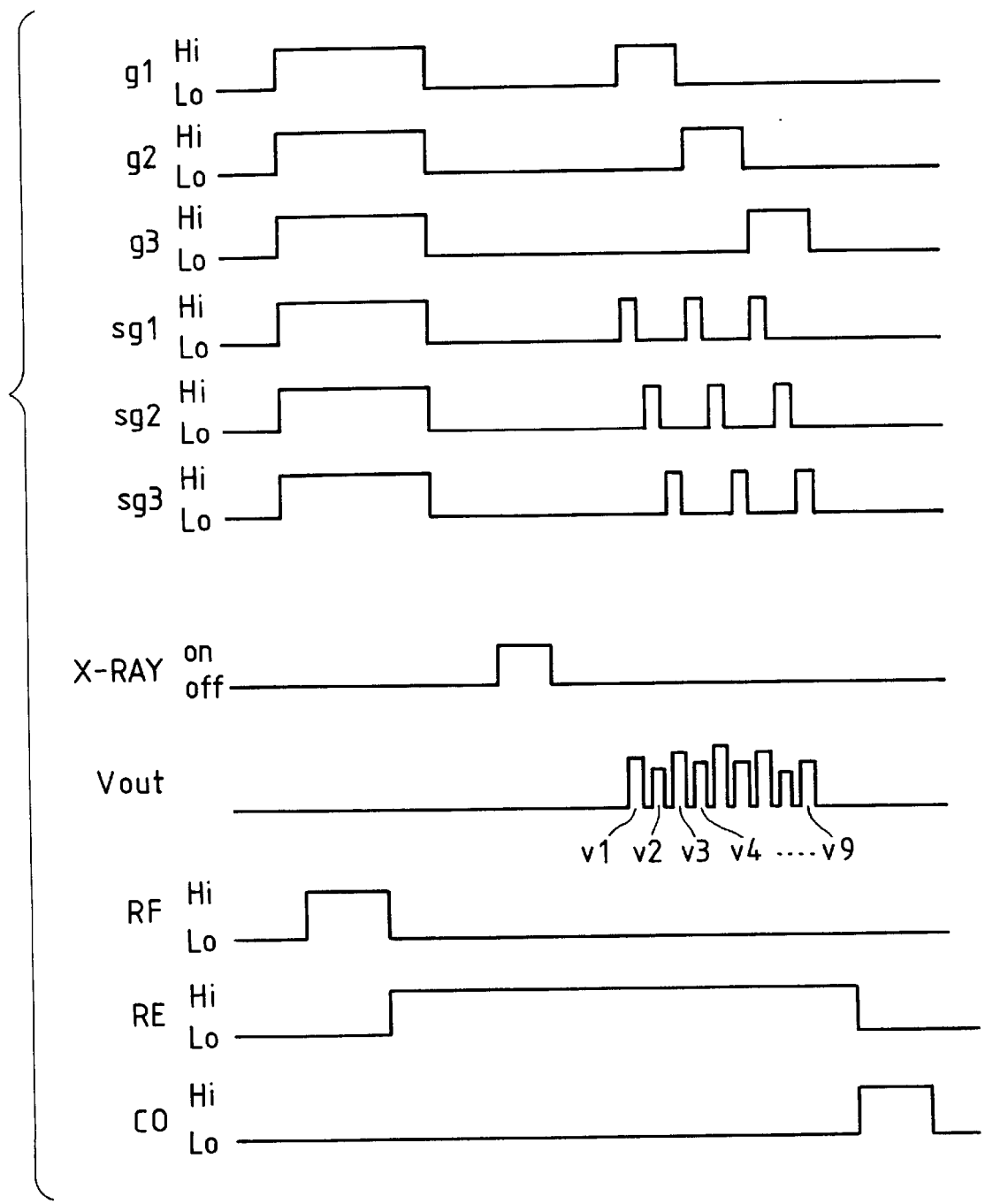
FIG. 18 is a timing chart showing an example of driving of the photoelectric conversion device.

FIG. 18 is a timing chart showing an example of the operation of the present invention. Initially, shift registers SR1 and SR2 apply Hi-level pulses to control lines g1 to g3 and sg1 to sg3. In response to these pulses, the transfer TFTs T11 to T33 and switches M1 to M3 are turned on to conduction, thereby setting the D electrodes of all the photoelectric conversion elements S11 to S33 at the GND potential (since the input terminal of an integral amplifier Amp is designed to have the GND potential).

At the same time, the shift register SR3 outputs a Hi-level pulse on a line RF to turn on the switch $SW_g$, and the G electrodes of all the photoelectric conversion elements S11 to S33 are applied with a voltage from the refresh power supply Vg. When the refresh power supply $V_g > 0$ is selected, since the same condition as $V_{rG} \geq V_D - V_{FB}$ described above with reference to FIG. 8 is established, a larger inrush current than that obtained under the condition of $V_{rG} < V_D - V_{FB}$ in FIG. 12 for $V_g < 0$ is produced, as described above, and the noise components increase. However, the dynamic range of each photoelectric conversion element broadens. Thereafter, all the photoelectric conversion elements S11 to S33 are set in the refresh mode and are refreshed.

Subsequently, the shift register SR3 outputs a Lo-level pulse on the line RF and a Hi-level pulse on a line RE to turn off the switch $SW_g$ and to turn on the switch $SW_s$, and the G electrodes of all the photoelectric conversion elements S11 to S33 are set at a negative potential by the read power supply $V_s$. With this operation, all the photoelectric conversion elements S11 to S33 are set in the photoelectric conversion mode, and at the same time, the capacitors C11 to C33 are initialized. In this state, the shift registers SR1 and SR2 apply Lo-level pulses to the control lines g1 to g3 and sg1 to sg3. In response to these pulses, the switches M1 to M3 of the transfer TFTs T11 to T33 are turned off, and the D electrodes of all the photoelectric conversion elements S11 to S33 are open in DC term, but the potentials are held by the capacitors C11 to C33. However, at this time, since no X-rays are incident, no light enters the photoelectric conversion elements S11 to S33, and no photocurrent flows. In this state, when X-ray pulses are output, pass through, e.g., a human body, and are incident on the phosphor (CsI), they are converted into light components, which become incident on the photoelectric conversion elements S11 to S33. These light components include information concerning the internal structure of, e.g., the human body. Photocurrents that flow in response to the incident light are stored as charges in the capacitors C11 to C33, and are held after the X-rays cease to be incident. The shift register SR1 then applies a Hi-level control pulse to the control line g1, and the shift register SR2 applies control pulses to the control lines sg1 to sg3, thereby sequentially outputting outputs v1 to v3 via the transfer TFTs T11 to T33 and the switches M1 to M3. In this manner, two-dimensional information of the internal structure of, e.g., a human body are obtained as outputs v1 to v9.

Thereafter, the shift register SR3 outputs a Lo-level pulse on the line RE and a Hi-level pulse on a line CO. Also, the shift registers SR1 and SR2 apply Hi-level pulses to the control lines g1 to g3 and sg1 to sg3. In response to these pulses, the switches M1 to M3 are turned on and are electrically connected to the transfer TFTs T11 to T33, thus setting the D electrodes of all the photoelectric conversion elements S11 to S33 at the GND potential (since the input terminal of an integral amplifier Amp is designed to have the GND potential). As a result, the G electrodes of all the photoelectric conversion elements S11 to S33 are set at a positive potential ($V_c$), and all the photoelectric conversion elements S11 to S33 are set in the flat-band voltage shift compensation mode.

A still image is obtained by the operations described so far. However, when a moving image is to be obtained, the operations described so far are repeated. In general, when a moving image is to be obtained, the intensity of X-rays to be irradiated is lower but the irradiation time is often longer than those upon obtaining a still image. For this reason, the signal light amount increases, and a broad dynamic range is required. Also, upon obtaining a moving image, positioning is often roughly made, and slight noise components or the like can often be ignored. Therefore, when a moving image is to be obtained, it is desirable to select a condition $V_{rG} \geq V_D - V_{FB}$, i.e., $V_g > 0$, that can assure a broad dynamic range. As described above, in this example, the refresh voltage can be changed in units of images as needed.

As in the above example, in this example, if the flat-band voltage shift compensation mode is an operation mode that can apply an electric field to the individual layers under the condition that the product ($V_{rG} \cdot q$) of the voltage ($V_{rG}$) of the first electrode layer of the photoelectric conversion element and the charge (q) of a carrier of the first type is larger than the product $\{(V_D - V_{FB}) \cdot q\}$ of the voltage ($V_D - V_{FB}$) obtained by subtracting the flat-band voltage ($V_{FB}$) from the voltage ($V_D$) of the second electrode layer, and the charge (q) of the carrier of the first type:

$(V_{rG} \cdot q) \geq (V_D \cdot q - V_{FB} \cdot q)$ characteristics with a broad dynamic range (D·R) and high S/N ratio can be obtained.

More specifically, when the photoelectric conversion device is driven for a long period of time, i.e., in the photoelectric conversion mode, $(V_{rG} \cdot q) < (V_D \cdot q - V_{FB} \cdot q)$ holds, and the flat-band voltage of the photoelectric conversion elements shifts in the negative direction. In order to restrain this shift, in the present invention, the flat-band voltage shift compensation mode is set, and the state opposite to that described above, i.e., the state $(V_{rG} \cdot q) \geq (V_D \cdot q - V_{FB} \cdot q)$, is set to restrain the shift of the flat-band voltage, thus broadening the dynamic range.

As in FIG. 15, the refresh power supply $V_g$ of the G electrodes of the photoelectric conversion elements 100 is set at a positive value in FIG. 16. As described above, the refresh power supply $V_g$ may be used as a negative value for the purpose of reducing the inrush current.

When the power supply $V_c$ comprises a power supply that can apply a relatively large voltage, the flat-band voltage shift compensation time, i.e., the time for turning on the switch $SW_c$, can be relatively short, and the total driving time of the photoelectric conversion device can be shortened.

As in the above example, the photoelectric conversion device of this example can be driven while switching the photoelectric conversion mode, refresh mode, and flat-band voltage shift compensation mode in turn, and can suppress the above-mentioned shift of the flat-band voltage. For this reason, the dynamic range of the sensor can be prevented from narrowing, and a high S/N ratio and stable characteristics can be assured.

In this example, since the G electrodes of the photoelectric conversion elements are connected to a common line, which is connected to the refresh power supply $V_g$, read power supply $V_s$, and flat-band voltage shift compensation power supply $V_c$ via the switches $SW_g$, $SW_s$, and $SW_c$, all the photoelectric conversion elements can be simultaneously switched to the refresh mode, photoelectric conversion mode, and flat-band voltage shift compensation mode. For this reason, an optical output can be obtained using one TFT per pixel without requiring any complicated control.

In this example, nine pixels are two-dimensionally arranged in a 3×3 matrix, and outputs in units of three pixels are simultaneously transferred and output three times. However, the present invention is not limited to such specific arrangement. For example, when 5×5 pixels per $mm^2$ are two-dimensionally arranged as a 2,000×2,000 matrix, a 40 cm×40 cm, large-area photoelectric conversion device can be realized. This photoelectric conversion device can be applied to an X-ray detector. When this device is combined with an X-ray generator in place of an X-ray film to constitute an X-ray radiography apparatus, such apparatus can be used in chest radiography examination, breast cancer examination, non-destructive inspection, and the like. Unlike films, the output from the apparatus can be instantaneously displayed on an image display apparatus such as a CRT, liquid crystal display apparatus, or the like. Furthermore, the output from the photoelectric conversion device can be converted into digital data, that can be subjected to image processing to be converted into a desired output. Also, the digital data can be saved in a magneto-optical disk, and previous images can be instantaneously retrieved. Moreover, the sensitivity is higher than that of films, and a clear image can be obtained using very weak X-rays that have little influence on the human body.

Figure 19:
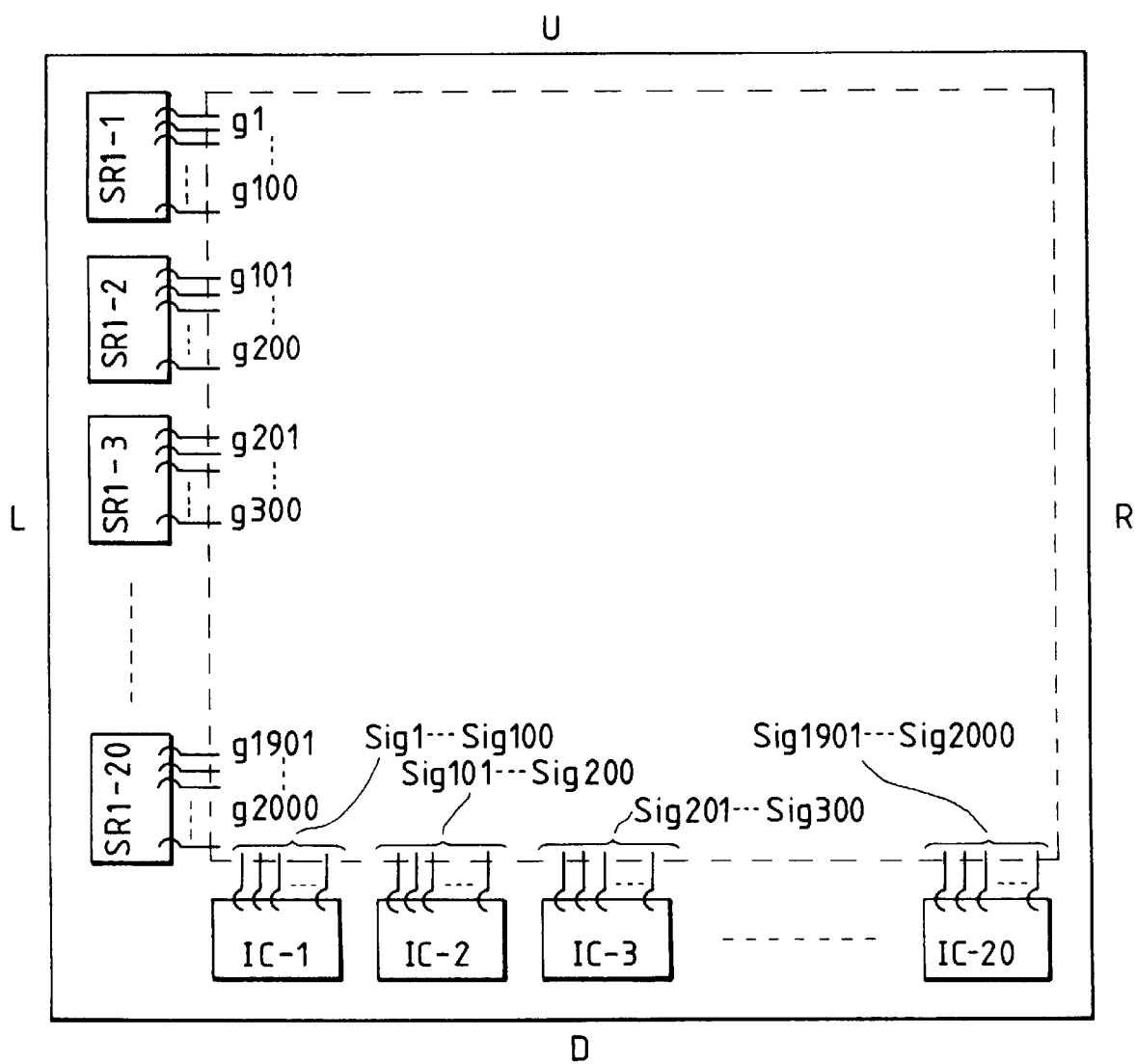
FIGS. 19 and 20 are schematic plan views for explaining examples of packaging.
Figure 20:
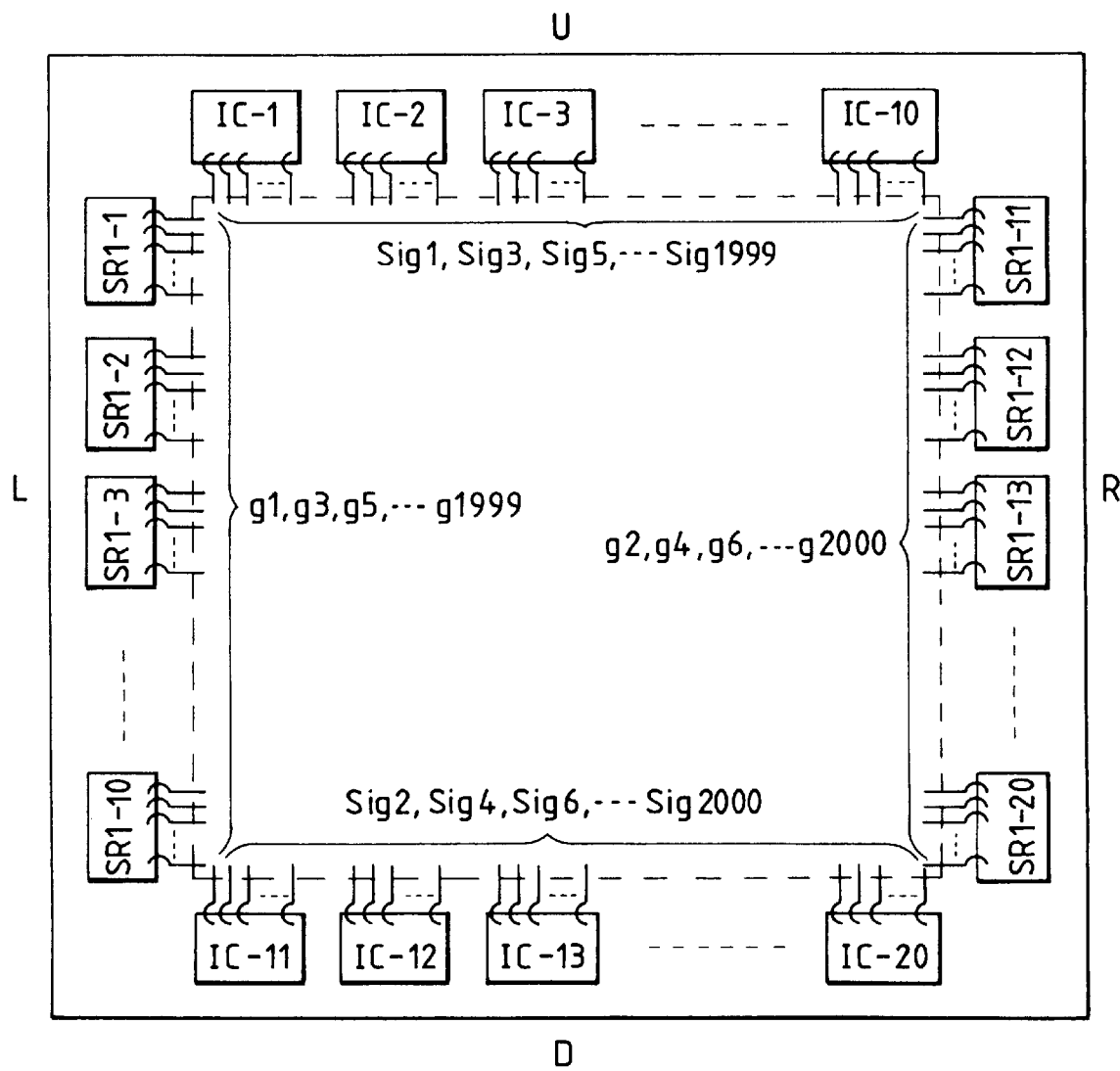

FIG. 19 or 20 shows the packaging state of a detector having 2,000×2,000 pixels. When the detector with 2,000×2,000 pixels is to be constituted, the number of elements enclosed in the broken line in FIG. 16 can be increased two-dimensionally. In this case, 2,000 control lines g1 to g2000, and 2,000 signal lines (SIG) sig1 to sig2000 are required. Also, the shift register SR1 and the detection integrated circuit IC have a large scale since they must control and process 2,000 lines. When such elements are realized using one-chip elements, one chip becomes very large, and is disadvantageous in terms of the yielding ratio, cost, and the like in the manufacture. In view of this problem, for example, the shift register SR1 is formed as one chip every 100 stages, i.e., 20 chips (SR1-1 to SR1-20) can be used. Also, the detection integrated circuit is formed as one chip for every 100 processing circuits, i.e., 20 chips (IC1 to IC20) can be used.

In FIG. 19, 20 chips (SR1-1 to SR1-20) are mounted on the left side (L), 20 chips are mounted on the lower side (D), and 100 control lines and 100 signal lines per chip are connected by wire bonding. The broken line portion in FIG. 19 corresponds to that in FIG. 16. Also, the external connection lines are not shown. Furthermore, the switches $SW_g$, $SW_s$, and $SW_c$, the power supplies $V_{g1}$ and $V_{g2}$, the lines RF, and the like are not shown. The detection integrated circuits IC1 to IC20 generate 20 outputs ($V_{out}$). These outputs may be combined into one output via switches, or may be directly output and subjected to parallel processing.

Alternatively, as shown in FIG. 20, 10 chips (SR1-1 to SR1-10) may be mounted on the left side (L), another 10 chips (SR1-11 to SR1-20) may be mounted on the right side (R), 10 chips (IC1 to IC10) may be mounted on the upper side (U), and another 10 chips (IC11 to IC20) may be mounted on the lower side (D). In this arrangement, since 1,000 wiring lines are distributed to each of the upper, lower, left, and right sides (U, D, L, R), the wiring line density of each side becomes low, and the wire bonding density of each side also becomes low, thus improving the yielding ratio. The wiring lines are distributed in such a manner that lines g1, g3, g5, . . . , g1999 are distributed to the left side (L), and lines g2, g4, g6, . . . , g2000 to the right side (R), i.e., the odd-numbered control lines are distributed to the left side (L), and the even-numbered control lines to the right side (R). With this arrangement, since the wiring lines are extended at equal intervals, the yielding ratio can be further improved without too high a local density. The same applies to the distribution of wiring lines to the upper and lower sides (U, D). Although not shown, as still another arrangement, the wiring lines may be distributed as follows. That is, lines g1 to g100, g201 to g300, . . . , g1801 to g1900 are distributed to the left side (L), and lines g101 to g200, g301 to g400, . . . , g1901 to g2000 are distributed to the right side (R), i.e., successive control lines in units of chips are alternately distributed to the left and right sides (L, R). With this arrangement, since control lines in one chip can be successively controlled, the driving timings can be determined easily, and the circuit arrangement can be prevented from being complicated, thus reducing the cost of the circuit. The same applies to the upper and lower sides (U, D), and a low-cost circuit can be used since continuous processing is allowed.

In both the examples shown in FIGS. 19 and 20, after the circuit enclosed in the broken line is formed on a single board, chips may be mounted on the board, or the circuit board corresponding to the broken line portion and chips may be mounted on another large board. Alternatively, chips may be mounted on a flexible circuit board, and may be adhered and connected to the circuit board corresponding to the broken line portion.

Such large-area photoelectric conversion device with a very large number of pixels cannot be realized in the complicated process using conventional photosensors. However, the number of processes in the manufacture of the photoelectric conversion device of the present invention is small since the individual elements are simultaneously formed using common films, and hence, the processes can be simplified. For these reasons, a high yielding ratio can be assured, and large-area, high-performance photoelectric conversion devices can be manufactured with low cost. Also, a capacitor and a photoelectric conversion element can be combined within a single element, and the number of elements can be substantially halved, thus further improving the yielding ratio.

In this manner, a plurality of photoelectric conversion elements are arranged one- or two-dimensionally, switch elements are connected in units of photoelectric conversion elements, all the photoelectric conversion elements are divided into a plurality of n blocks, and the switch elements operate in units of blocks to output optical signals from n×m photoelectric conversion elements divided into the n blocks via matrix signal lines. Each crossing portion of the matrix wiring lines is constituted by a multi-layered structure in the order of at least a first electrode layer, an insulating layer, a semiconductor layer, and a second electrode layer, and the respective layers in the multi-layered structure use the same layers as a first electrode layer, an insulating layer, a photoelectric conversion semiconductor layer, and a second electrode layer of each photoelectric conversion element to have the same film thicknesses as those of the layers of the photoelectric conversion element. With this structure, when the flat-band voltage shift compensation power supply is supplied appropriately, characteristics with a broad dynamic range, a high S/N ratio, and the like can be obtained. Since the flat-band voltage shift compensation driving can be concurrently attained in units of lines, the voltage $V_{FB}$ can be restrain on a two-dimensional, large area without increasing the reading time.

<Third Embodiment>

Figure 21:
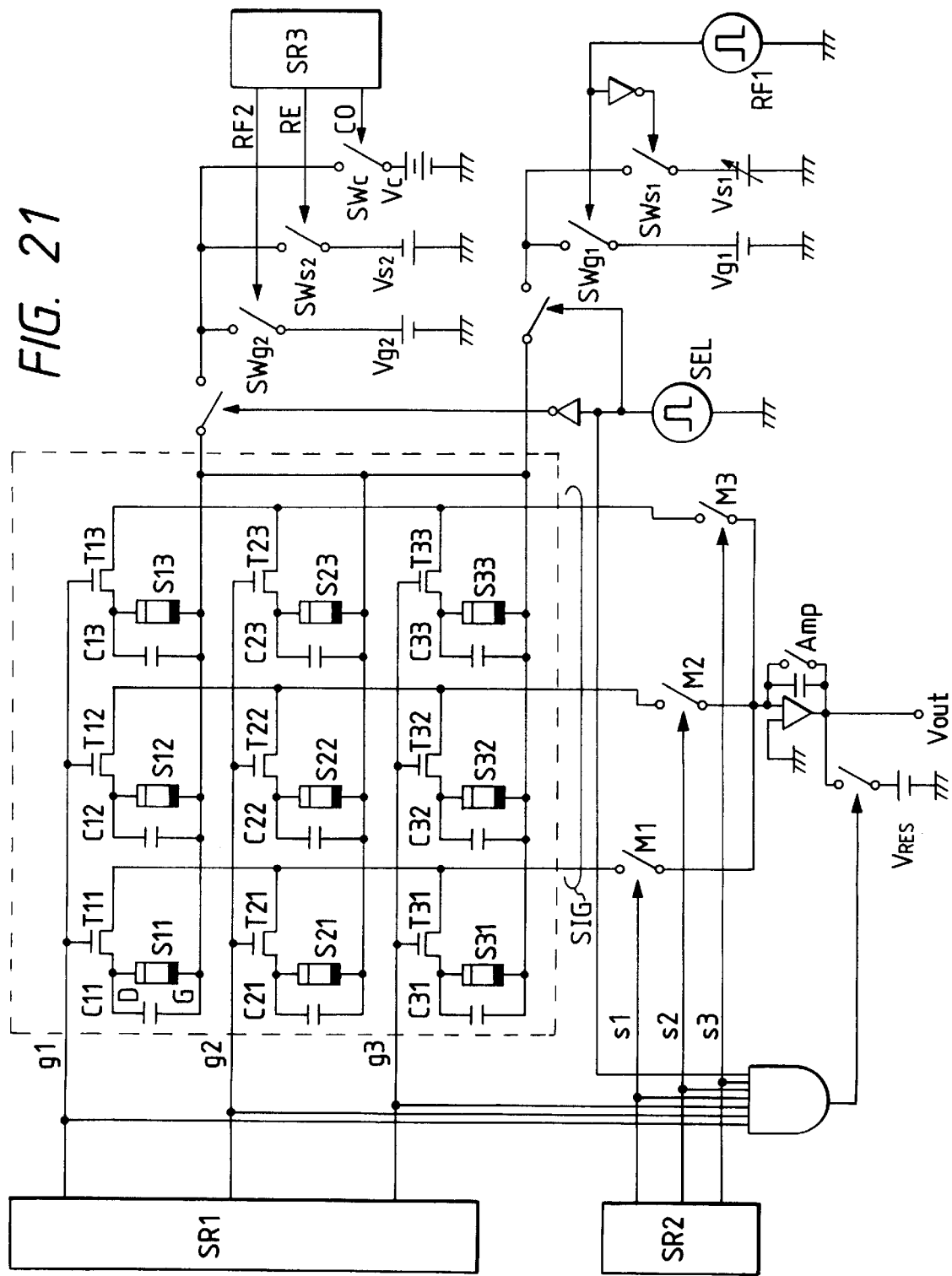
FIG. 21 is a schematic circuit diagram showing an example of a photoelectric conversion device.

FIG. 21 is a circuit diagram showing the overall photoelectric conversion device according to the third embodiment of the present invention.

Referring to FIG. 21, photoelectric conversion elements S11 to S33, the lower electrode side of which is indicated by G and the upper electrode side of which is indicated by D, are connected to transfer TFTs T11 to T33 via accumulation capacitors C11 to C33. The device includes a refresh power supply $V_{g1}$ and a variable voltage power supply $V_{s1}$ used for measuring the flat-band voltage. The power supply $V_{s1}$ resets the potentials of the G electrodes of all the photoelectric conversion elements S11 to S33, and has the same function as the power Supply $V_d$ described in the first embodiment. These power supplies are connected to the G electrodes of all the photoelectric conversion elements S11 to S33 via switches $SW_{s1}$ and $SW_{g1}$. The switches $SW_{s1}$ and $SW_{g1}$ are directly connected to a timing pulse circuit RF1 and are controlled not to be turned on at the same time. Also, the ON times of these switches can be arbitrarily set.

In FIG. 21, one pixel is constituted by one photoelectric conversion element, one capacitor, and one TFT, and its signal output is connected to a detection integrated circuit IC via a signal line SIG. In the photoelectric conversion device of this embodiment, a total of nine pixels are divided into three blocks. The outputs from three pixels per block are simultaneously transferred, and are sequentially converted into outputs by the detection integrated circuit IC via the signal lines SIG, thus obtaining outputs ($V_{out}$). Three pixels in one block are arranged in the horizontal direction, and the three blocks are arranged in the vertical direction, thus arranging pixels two-dimensionally. The portion surrounded by the broken line in FIG. 21 is formed on a single, large-area insulating substrate.

On the other hand, as elements corresponding to one pixel in this embodiment, those having the structure described above with reference to FIGS. 17A and 17B can be used.

The operation when a timing pulse SEL is at Hi level in FIG. 21, i.e., when the circuit on the side of the timing pulse circuit RF1 is selected and the flat-band voltage is to be measured, will be described below with reference to FIGS. 21, 22, and 23.

Figure 22:
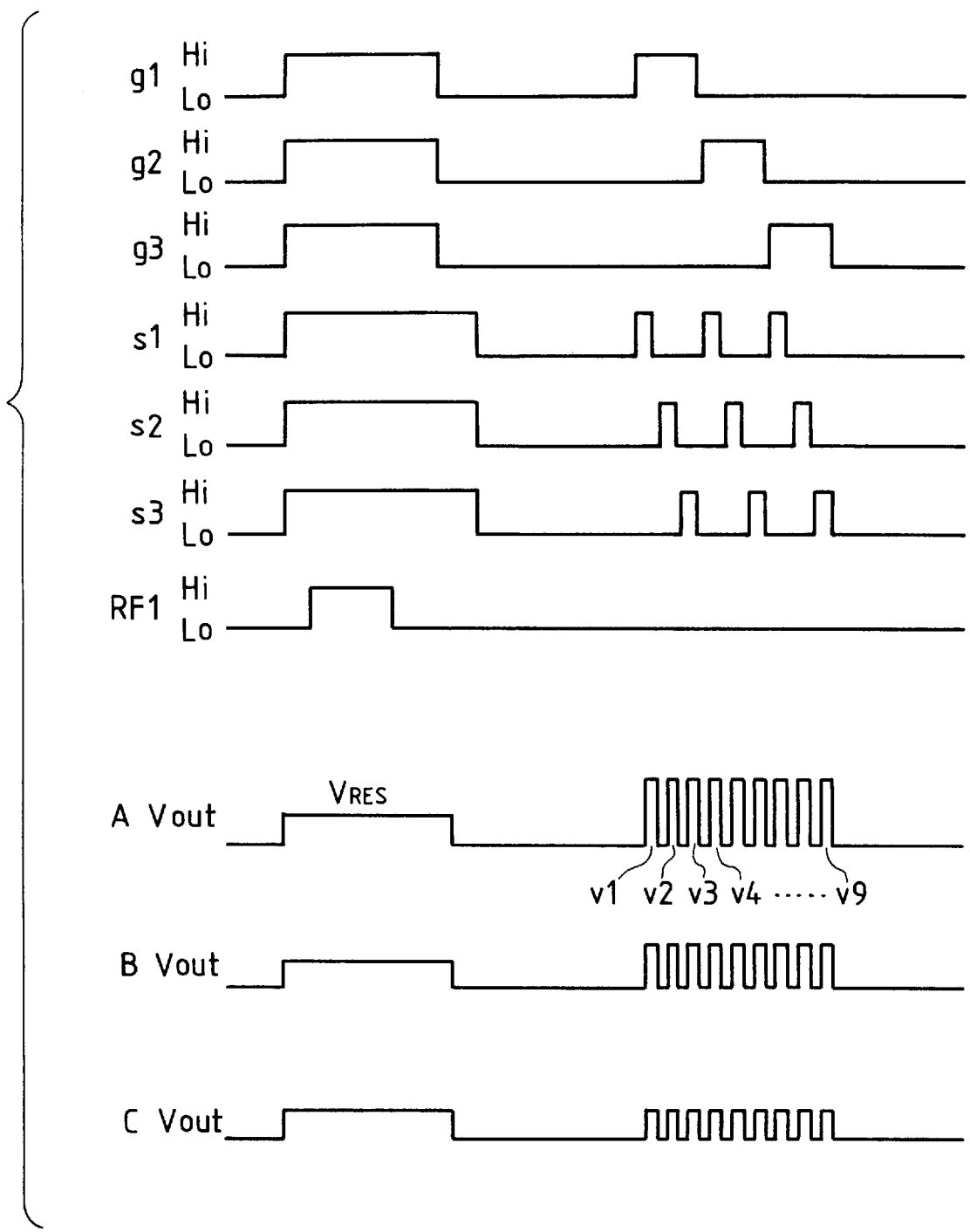
FIG. 22 is a timing chart for explaining an example of driving of a photoelectric conversion device.

FIG. 22 is a timing chart showing the operation of this embodiment when the timing pulse SEL is at Hi level in FIG. 21, i.e., when the circuit on the side of the timing pulse circuit RF1 is selected and the flat-band voltage is to be measured.

The refresh mode will be explained below.

Initially, shift registers SR1 and SR2 shown in FIG. 21 apply Hi-level pulses to control lines g1 to g3 and s1 to s3. In response to these pulses, the transfer TFTs T11 to T33 and switches M1 to M3 are turned on to conduction, thereby setting the D electrodes of all the photoelectric conversion elements S11 to S33 at a potential $V_{RES}$. This operation is equivalent to that for resetting the potentials at the G electrode side of the photoelectric conversion elements not to GND but to the positive potential $V_{RES}$, and transferring charges accumulated in the photoelectric conversion elements 100 by resetting via the transfer TFTs. When the charges are transferred toward the Amp side using the transfer TFTs T11 to T33, the potential $V_{out}$ on the side of an integral detector Amp always assumes a positive value.

At the same time, the timing pulse circuit RF1 outputs a Hi-level pulse to turn on the switch $SW_{g1}$, and the G electrodes of all the photoelectric conversion elements S11 to S33 are set at the refresh power supply potential $V_{g1}$. Thereafter, all the photoelectric conversion elements S11 to S33 are set in the refresh mode and are refreshed.

The operation shown in FIG. 9 above is premised on the assumption that an optical signal is incident on each photoelectric conversion element 100, and a photocurrent Is of the photoelectric conversion element 100 is generated. However, in this embodiment, all the photoelectric conversion elements S11 to S33 are set in the dark state, and the light incident amount is zero.

The flat-band voltage measurement mode will be explained below.

In FIG. 22, when the signals on lines g1 to g3 change to Lo level and those on lines s1 to s3 change to Hi level, since the input terminal of the integral amplifier Amp is designed to have the GND potential, the output $V_{out}$ is set at GND. As a result, all the photoelectric conversion elements S11 to S33 are set in the photoelectric conversion mode, and at the same time, the capacitors C11 to C33 are initialized.

Subsequently, the shift registers SR1 and SR2 apply Lo-level pulses to the control lines g1 to g3 and s1 to s3. In response to these pulses, the switches M1 to M3 of the transfer TFTs T11 to T33 are turned on, and the D electrodes of all the photoelectric conversion elements S11 to S33 are open in DC term but their potentials are held by the capacitors C11 to C33.

The shift register SR1 applies a Hi-level control pulse to the control line g1, and the shift register SR2 applies control pulses to the control lines s1 to s3, thus sequentially outputting outputs v1 to v3 via the transfer TFTs T11 to T33 and the switches M1 to M3. With this operation, two-dimensional information corresponding to the capacitances of all the photoelectric conversion elements S11 to S33 is obtained as signals v1 to v9.

Pseudo C-V characteristics will be explained below.

Figure 23:
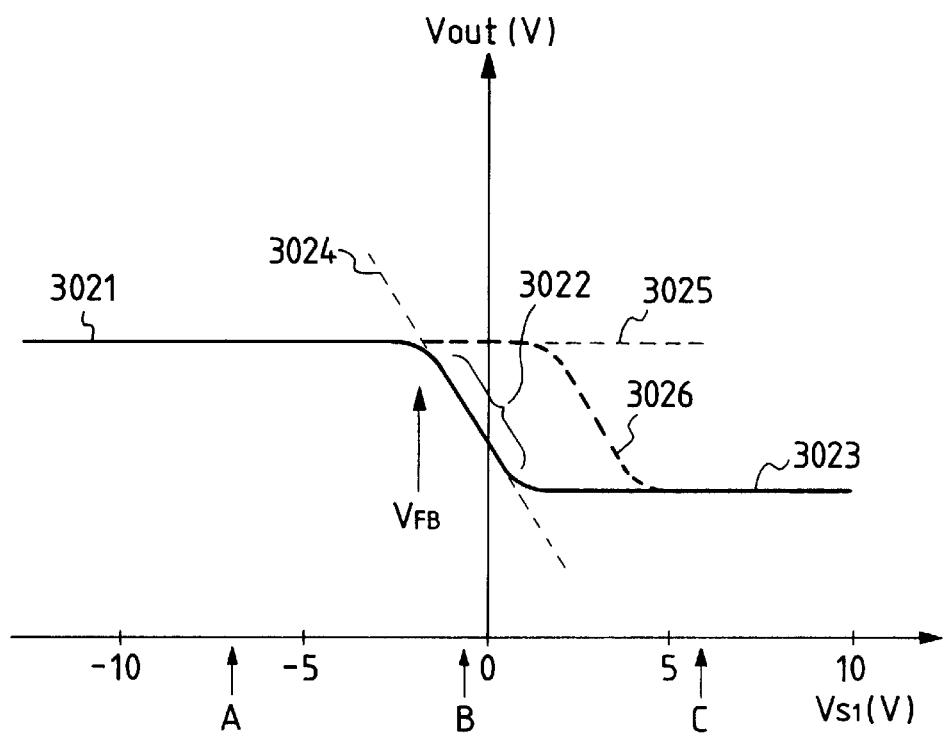
FIG. 23 is a graph for explaining pseudo C-V characteristics of a photoelectric conversion element.

FIG. 23 shows the pseudo C-V characteristics. When the output from the variable voltage power supply $V_{s1}$ shown in FIG. 21 is changed, as indicated by A, B, and C in FIG. 23, the capacitance values of all the photoelectric conversion elements S11 to S33 change, and the charges accumulated on the D electrodes of all the photoelectric conversion elements S11 to S33 and the D electrode sides of the capacitors C11 to C33 change accordingly. The waveforms $V_{out}$ A, B, and C in FIG. 22 represent such states.

As can be seen from FIG. 22, when the output from the variable voltage power supply $V_{s1}$ is changed, the capacitance values of all the photoelectric conversion elements S11 to S33 change, and the charges accumulated on the D electrodes of all the photoelectric conversion elements S11 to S33 and the D electrode sides of the capacitors C11 to C33 change accordingly. Consequently, the pseudo C-V characteristics, i.e., the flat-band voltage, can be obtained.

The output read mode will be explained below.

The operation when the timing pulse SEL is at Lo level in FIG. 21, i.e., when the circuit on the SR3 side is selected and the output read mode including the mode of compensating for shifts of the flat-band voltage is set, will be explained below.

Referring to FIG. 21, a read power supply $VS_2$, a refresh power supply $V_{g2}$, and a flat-band voltage shift compensation power supply $V_c$ are connected to the G electrodes of all the photoelectric conversion elements S11 to S33 via switches $SW_{s2}$, $SW_{g2}$, and $SW_c$. Note that the potentials of the individual power supplies to be applied to the G electrodes of the sensors are set to satisfy $V_c > V_g > 0 > V_s$. The switches $SW_{s2}$, $SW_{g2}$, and $SW_c$ are directly connected to the shift register SR3, and are controlled not to be simultaneously turned on. Also, the ON times of these switches can be arbitrarily set.

Figure 24:
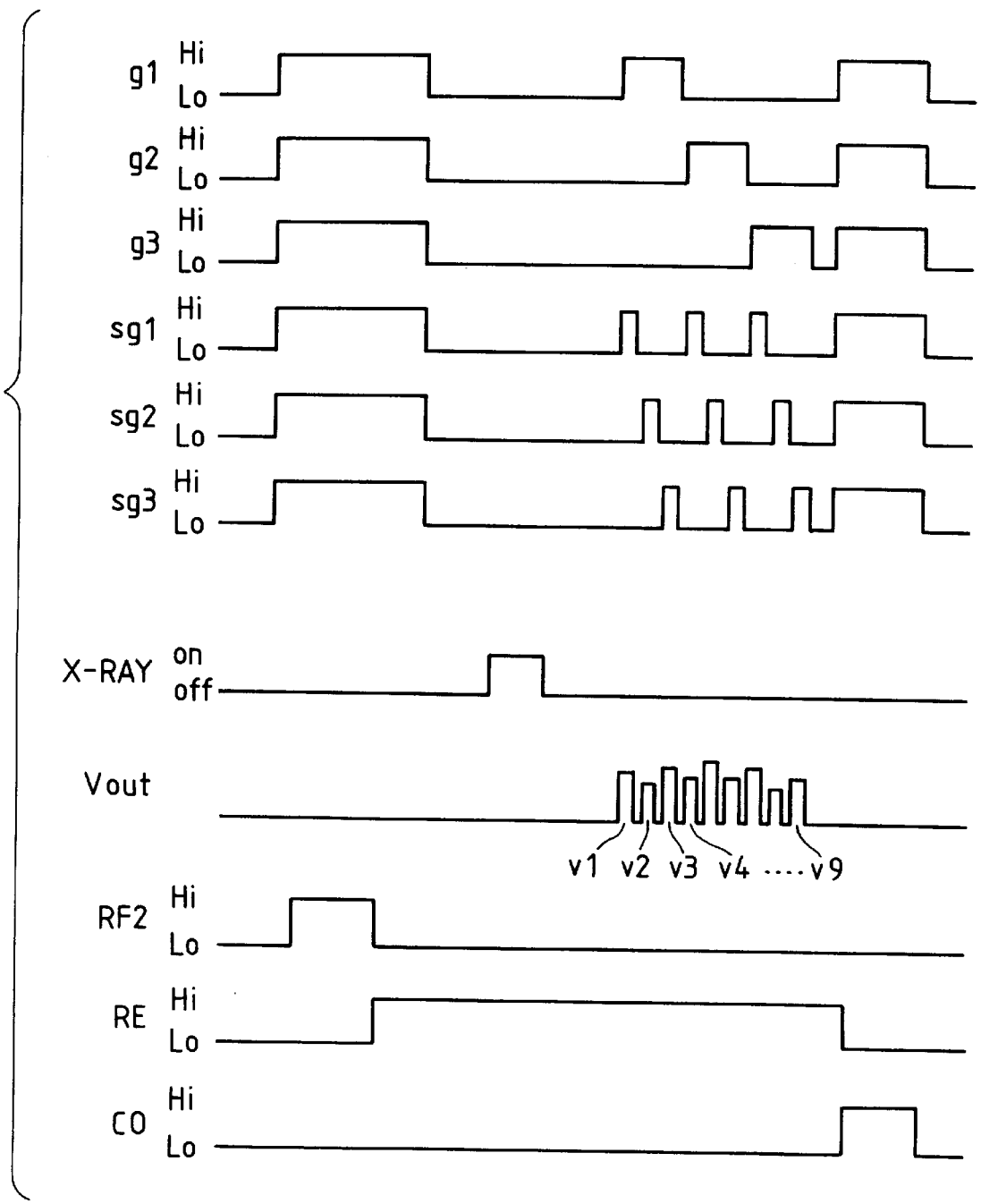
FIG. 24 is a timing chart for explaining an example of driving of the photoelectric conversion device.

FIG. 24 is a timing chart of this embodiment. The operation of the photoelectric conversion device of this embodiment will be described below with reference to FIGS. 21 to 24.

[Refresh Mode]

Initially, the shift registers SR1 and SR2 apply Hi-level pulses to the control lines g1 to g3 and s1 to s3. In response to these pulses, the switches M1 to M3 are turned on and are electrically connected to the transfer TFTs T11 to T33, thus setting the D electrodes of all the photoelectric conversion elements S11 to S33 at the GND potential (since the input terminal of the integral amplifier Amp is designed to have the GND potential). At the same time, the shift register SR3 outputs a Hi-level pulse to a line RF2 to turn on the switch $SW_{g2}$, and the G electrodes of all the photoelectric conversion elements S11 to S33 are set at the potential of the refresh power supply $V_{g2}$. When the refresh power supply $V_{g2} > 0$ is selected, since the same condition as $V_{rG} \geq V_D - V_{FB}$ described above with reference to FIG. 8 is established, a larger inrush current than that obtained under the condition of $V_{rG} < V_D - V_{FB}$ in FIG. 12 that selects $V_{g2} < 0$ is produced, as described above, and the noise components increase. However, the dynamic range of each photoelectric conversion element broadens. Thereafter, all the photoelectric conversion elements S11 to S33 are set in the refresh mode and are refreshed.

[Read Mode]

Next, the shift register SR3 outputs a Lo-level pulse on the line RF2 and a Hi-level pulse on a line RE to turn off the switch $SW_{g2}$ and to turn on the switch $SW_{s2}$, thereby setting the G electrodes of all the photoelectric conversion elements S11 to S33 at a negative potential by the read power supply $V_{s2}$. With this operation, all the photoelectric conversion elements S11 to S33 are set in the photoelectric conversion mode, and at the same time, the capacitors C11 to C33 are initialized. In this state, the shift registers SR1 and SR2 apply Lo-level pulses to the control lines g1 to g3 and s1 to s3. In response to these pulses, the switches M1 to M3 of the transfer TFTs T11 to T33 are turned off, and the D electrodes of all the photoelectric conversion elements S11 to S33 are open in DC term, but the potentials are held by the capacitors C11 to C33. However, at this time, since no X-rays are incident, no light enters the photoelectric conversion elements S11 to S33, and no photocurrent flows.

In this state, when X-ray pulses are output, pass through, e.g., a human body, and are incident on a phosphor (CsI), they are converted into light components, which become incident on the photoelectric conversion elements S11 to S33. These light components include information concerning the internal structure of, e.g., the human body. Photocurrents that flow in response to the incident light are stored as charges in the capacitors C11 to C33, and are held after the X-rays cease to be incident. The shift register SR1 then applies a Hi-level control pulse to the control line g1, and the shift register SR2 applies control pulses to the control lines s1 to s3, thereby sequentially outputting outputs v1 to v3 via the transfer TFTs T11 to T33 and the switches M1 to M3. In this manner, two-dimensional information of the internal structure of, e.g., a human body are obtained as outputs v1 to v9.

[Flat-band Voltage Shift Compensation Mode]

Thereafter, the shift register SR3 outputs a Lo-level pulse on the line RE2 and a Hi-level pulse on a line CO. Also, the shift registers SR1 and SR2 apply Hi-level pulses to the control lines g1 to g3 and s1 to s3. In response to these pulses, the transfer TFTs T11 to T33 and the switches M1 to M3 are turned on to conduction, thus setting the D electrodes of all the photoelectric conversion elements S11 to S33 at the GND potential (since the input terminal of an integral amplifier Amp is designed to have the GND potential). As a result, the G electrodes of all the photoelectric conversion elements S11 to S33 are set at a positive potential ($V_c$), and all the photoelectric conversion elements S11 to S33 are set in the flat-band voltage shift compensation mode.

A still image is obtained by the operations described so far. However, when a moving image is to be obtained, the operations described so far are repeated. In general, when a moving image is to be obtained, the intensity of X-rays to be irradiated is lower but the irradiation time is often longer than those upon obtaining a still image. For this reason, the signal light amount increases, and a broad dynamic range is required. Also, upon obtaining a moving image, positioning is often roughly made, and slight noise components or the like can often be ignored. Therefore, when a moving image is to be obtained, it is desirable to select a condition $V_{rG} \geq V_D - V_{FB}$, i.e., $V_{g2} < 0$, that can assure a broad dynamic range. As described above, in this example, the refresh voltage can be changed in units of images as needed.

As in FIG. 21, the refresh power supply $V_{g2}$ of the G electrodes of the photoelectric conversion elements 100 is set at a positive value in FIG. 22. As described above, the refresh power supply $V_{g2}$ may be used as a negative value for the purpose of reducing the inrush current.

When the power supply $V_c$ comprises a power supply that can apply a relatively large voltage, the flat-band voltage shift compensation time, i.e., the time for turning on the switch $SW_c$, can be relatively short, and the total driving time of the photoelectric conversion device can be shortened.

The photoelectric conversion device of this embodiment can be driven while switching the photoelectric conversion mode, refresh mode, and flat-band voltage shift compensation mode in turn, and can suppress the above-mentioned shift of the flat-band voltage. For this reason, the dynamic range of the sensor can be prevented from narrowing, and a high S/N ratio and stable characteristics can be assured.

In this embodiment, since the G electrodes of the photoelectric conversion elements are connected to a common line, which is connected to the refresh power supply $V_{g2}$, read power supply $V_{s2}$, and flat-band voltage shift compensation power supply $V_c$ via the switches $SW_{g2}$, $SW_{s2}$, and $SW_c$, all the photoelectric conversion elements can be simultaneously switched to the refresh mode, photoelectric conversion mode, and flat-band voltage shift compensation mode. For this reason, an optical output can be obtained using one TFT per pixel without requiring any complicated control.

In this embodiment, nine pixels are two-dimensionally arranged in a 3×3 matrix, and outputs in units of three pixels are simultaneously transferred and output three times. However, the present invention is not limited to such specific arrangement. For example, 5×5 pixels per mm$^2$ may be two-dimensionally arranged as a 2,000×2,000 matrix.

<Fourth Embodiment>

Figure 25:
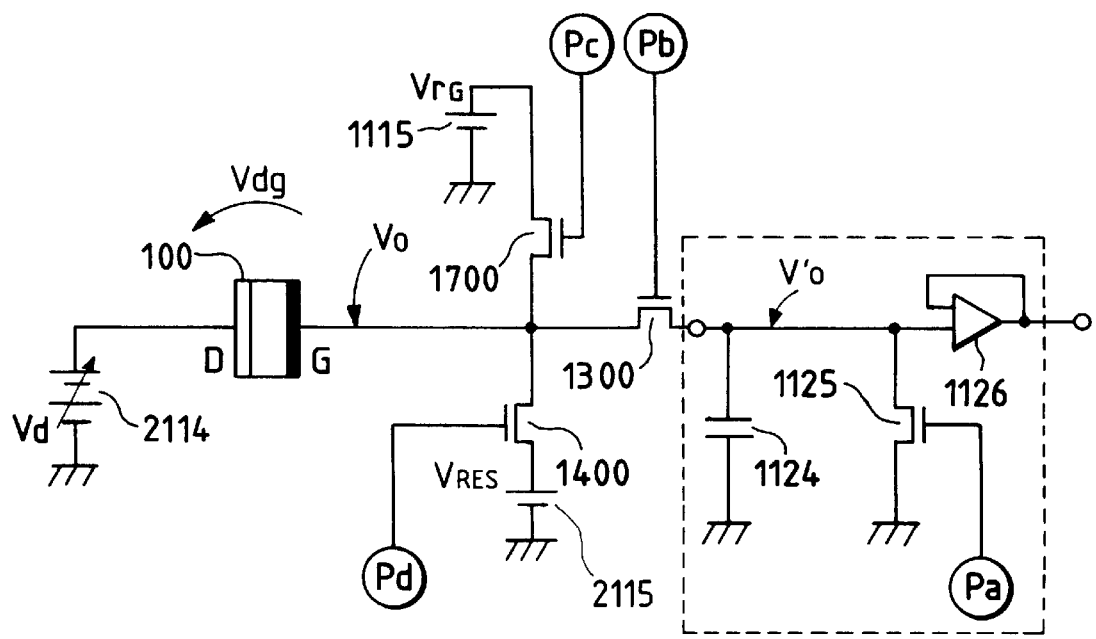
FIG. 25 is a schematic circuit diagram for explaining an example of a photoelectric conversion device.

FIG. 25 is an equivalent circuit diagram of a 1-bit circuit for explaining the method of driving the photoelectric conversion device according to the fourth embodiment. The same reference numerals in FIG. 25 denote the same parts as in FIG. 8.

The first difference from FIG. 8 is that a power supply 2114 which can vary a voltage $V_d$ and is used for measuring the flat-band voltage ($V_{FB}$) of the photoelectric conversion element 100 is arranged in place of the power supply 114, and has a function of changing the photoelectric conversion element 100 between a state with a relatively small total capacitance (depletion state) and a state with a relatively large total capacitance (accumulation state) in correspondence with $V_d$.

The second difference is that a power supply 2115 for resetting the potential of the G electrode of the photoelectric conversion element 100 not to GND but to a positive potential $V_{RES}$ is arranged. When the potential of the G electrode of the photoelectric conversion element 100 is reset not to GND but to the positive potential $V_{RES}$, and the charge accumulated in the photoelectric conversion element 100 by resetting is transferred to a capacitor 1124 using a TFT 1300, a potential $V_o'$ on the TFT 1300 side of the capacitor 1124 is always a positive potential.

The device in FIG. 8 above is premised on the assumption that an optical signal is incident on each photoelectric conversion element 100, and a photocurrent Is of the photoelectric conversion element 100 is generated. However, in this embodiment, all the photoelectric conversion element 100 is set in the dark state, and the light incident amount is zero.

The operation of this embodiment will be described below with reference to FIGS. 25 and 26, and FIG. 9.

The basic operation is the same as that shown in FIG. 9, as described above, but the photocurrent Is is always zero since the element 100 is in the dark state. The potentials $V_O$ and $V_o'$ immediately after the TFT 1300 is turned on in response to a Hi-level signal Pb show dependence on the variable voltage $V_d$ since the capacitance value of the photoelectric conversion element 100 changes depending on the magnitude of the variable voltage $V_d$ in FIG. 25, and the amount of charge accumulated in the G electrode side of the photoelectric conversion element 100 (in $V_{RES}$ by a TFT 1400) changes accordingly.

Figure 26:
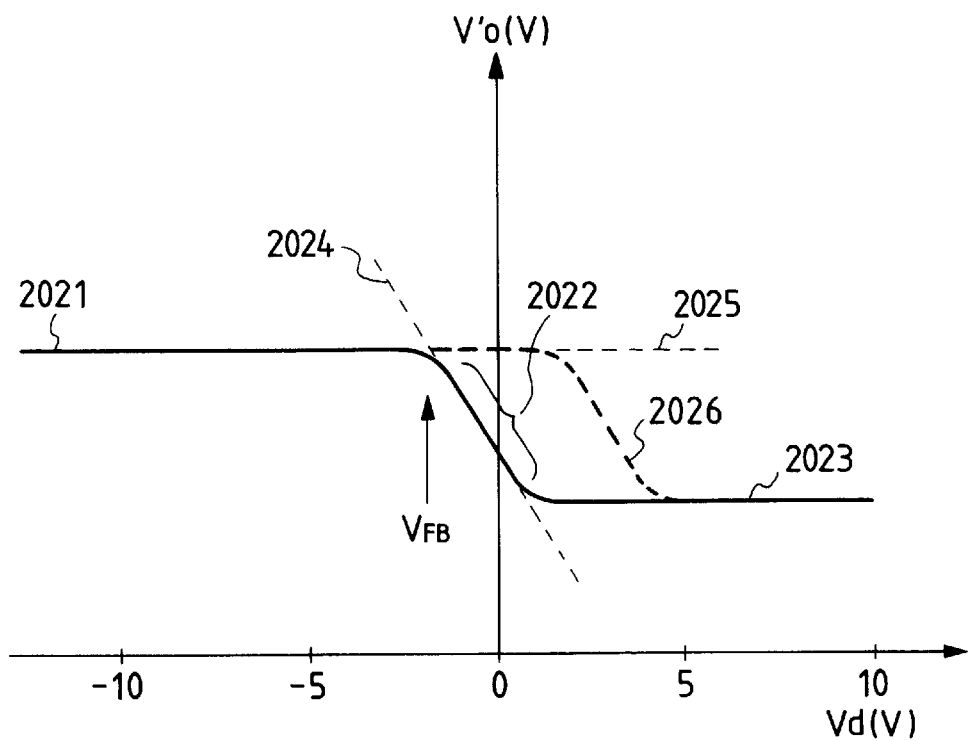
FIG. 26 is a graph for explaining pseudo C-V characteristics of a photoelectric conversion element.

FIG. 26 shows this state. In the graph of FIG. 26 that shows the $V_O'$-$V_d$ characteristics, the intersection between an extending line 2024 of a linear portion of a portion 2022 in which the capacitance value of the photoelectric conversion element 100 is changing from an accumulation state 2021 to a depletion state 2023, i.e., the portion 2022 in which the potential $V_0'$ is changing from high to low, and an extending line 2025 of a linear portion that represents the accumulation state is determined to be the flat-band voltage $V_{FB}$.

As has been described previously, in the photoelectric conversion element in the photoelectric conversion device shown in FIGS. 4A and 4B of the present invention, since the flat-band voltage $V_{FB}$ consequently changes in the negative direction, and its characteristics change, as indicated by a dotted curve 2026 in FIG. 26, the dynamic range of the photoelectric conversion element narrows. As a result, the S/N ratio of the photoelectric conversion device lowers, and stable characteristics cannot be obtained.

When the driving method of the present invention is used, the pseudo C-V characteristics of the photoelectric conversion element 100 can be obtained, and as a consequence, the flat-band voltage $V_{FB}$ can be obtained. When the shift amount of the flat-band voltage $V_{FB}$ can be confirmed, a driving method that makes the shift amount of the flat-band voltage $V_{FB}$ zero can be realized.

For this reason, the dynamic range of the photoelectric conversion element 100 can be prevented from narrowing, and a high S/N ratio and stable characteristics can be assured.

<Fifth Embodiment>

Figure 27:
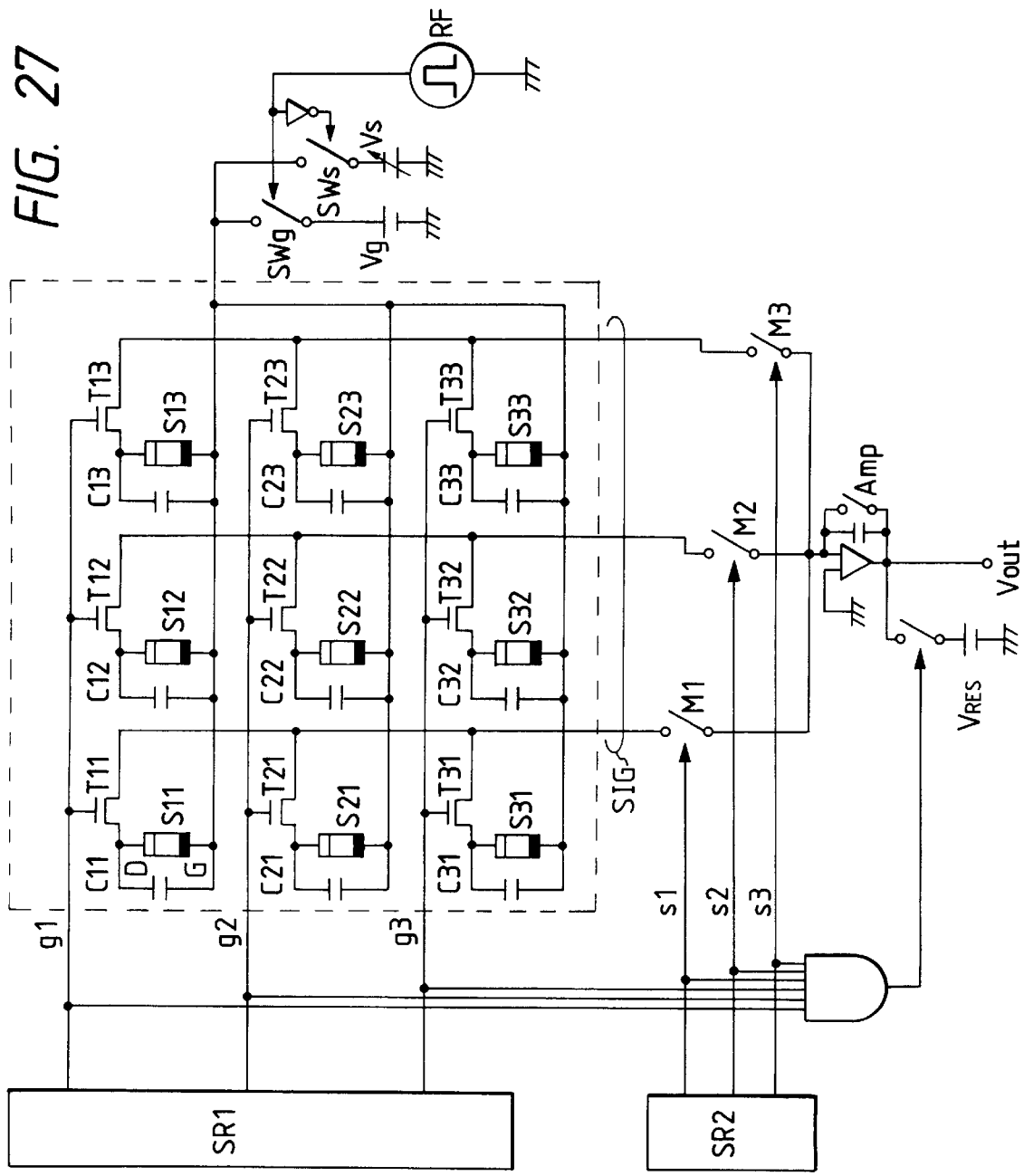
FIG. 27 is a schematic circuit diagram for explaining an example of a photoelectric conversion device.

FIG. 27 is a schematic circuit diagram showing the overall photoelectric conversion device according to the fifth embodiment of the present invention.

Referring to FIG. 27, photoelectric conversion elements S11 to S33, the lower electrode side of which is indicated by G and the upper electrode side of which is indicated by D, are connected to transfer TFTs T11 to T33 via accumulation capacitors C11 to C33. The device also includes a refresh power supply $V_g$ and a variable voltage power supply $V_s$ used for measuring the flat-band voltage. The power supply $V_s$ resets the potentials of the G electrodes of all the photoelectric conversion elements S11 to S33, and has the same function as that of $V_d$ described in the fourth embodiment.

These power supplies are connected to the G electrodes of all the photoelectric conversion elements S11 to S33 via switches $SW_s$ and $SW_g$. Note that the switches $SW_s$ and $SW_g$ are directly connected to a timing pulse circuit RF, and are controlled not to be turned on at the same time. Also, the ON times of these switches can be arbitrarily set.

One pixel is constituted by one photoelectric conversion element, one capacitor, and one TFT, and its signal output is connected to a detection integrated circuit IC via a signal line SIG. In the photoelectric conversion device of this embodiment, a total of nine pixels are divided into three blocks. The outputs from three pixels per block are simultaneously transferred, and are sequentially converted into outputs by the detection integrated circuit IC via the signal lines SIG, thus obtaining outputs ($V_{out}$). Three pixels in one block are arranged in the horizontal direction, and the three blocks are arranged in the vertical direction, thus arranging pixels two-dimensionally.

A portion surrounded by the broken line in FIG. 27 is formed on a single, large-area insulating substrate.

The operation of the photoelectric conversion device of this embodiment will be described below with reference to FIGS. 27, 28, and 29.

Figure 28:
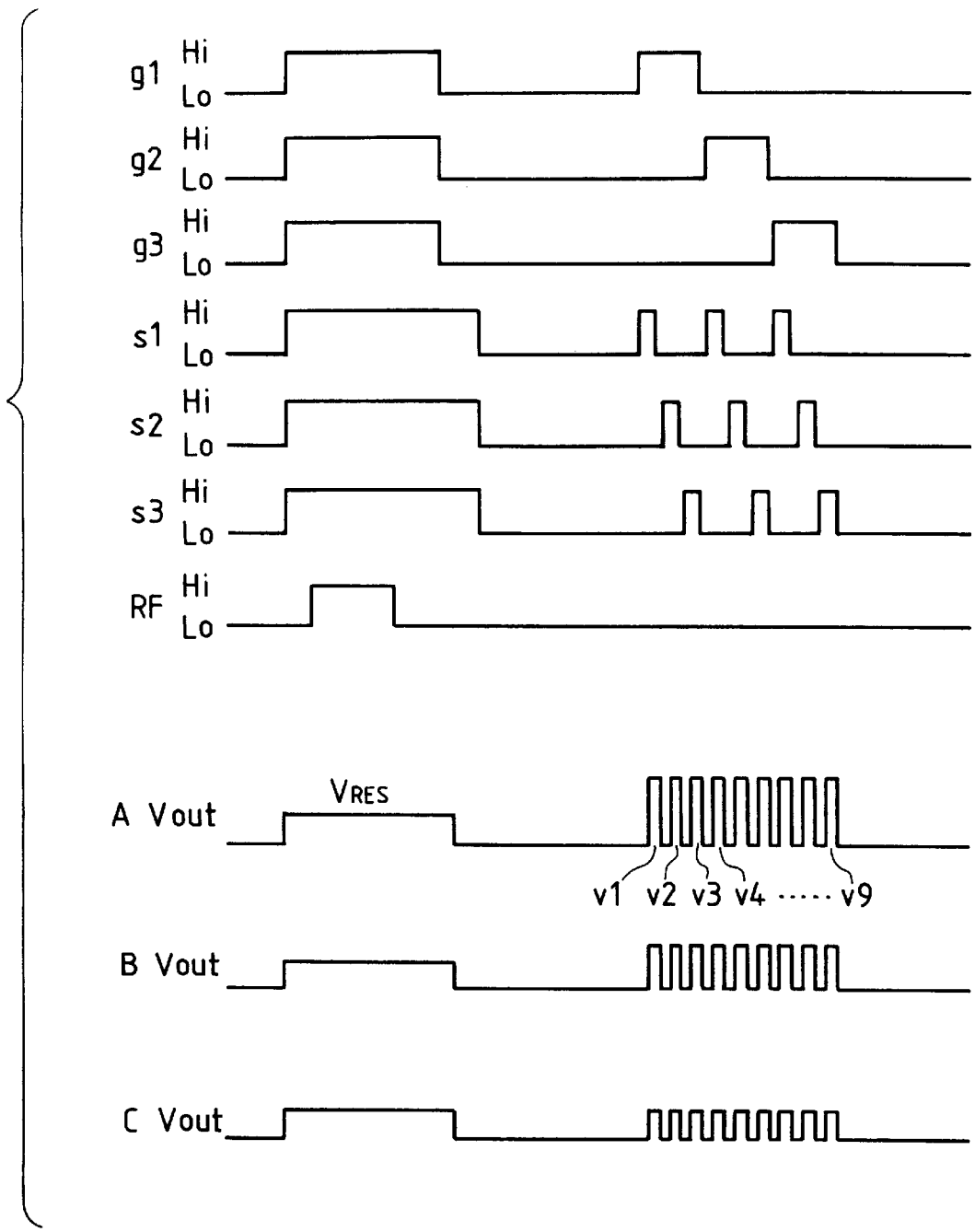
FIG. 28 is a timing chart for explaining an example of driving of the photoelectric conversion device.

FIG. 28 is a timing chart showing an example of the operation of this embodiment.

Initially, shift registers SR1 and SR2 apply Hi-level pulses to control lines g1 to g3 and s1 to s3. In response to these pulses, switches M1 to M3 are turned on and are electrically connected to the transfer TFTs T11 to T33, thus setting the D electrodes of all the photoelectric conversion elements S11 to S33 and the terminals on the D electrode side of the capacitors C11 to C33 at a potential $V_{RES}$. As described in the third embodiment, this operation is equivalent to that for resetting the potentials at the G electrode side of the photoelectric conversion elements not to GND but to the positive potential $V_{RES}$, and transferring the charges accumulated in the photoelectric conversion elements 100 by resetting via the transfer TFTs. When the charges are transferred toward the Amp side using the transfer TFTs T11 to T33, the potential $V_{out}$ on the side of an integral detector Amp always assumes a positive value. A switch and the reset power supply $V_{RES}$ in FIG. 27 for resetting the signals on the lines g1 to g3 and s1 to s3, an AND element, and the potential $V_{out}$ on the integral detector Amp side are elements for attaining the above-mentioned operation.

At the same time, the timing pulse circuit RF outputs a Hi-level pulse to turn on the switch $SW_g$, thereby setting the G electrodes of all the photoelectric conversion elements S11 to S33 at the refresh power supply potential $V_g$. Thereafter, all the photoelectric conversion elements S11 to S33 are set in the refresh mode and are refreshed.

The device in FIG. 8 is premised on the assumption that an optical signal is incident on each photoelectric conversion element 100, and a photocurrent Is of the photoelectric conversion element 100 is generated. However, in this embodiment, all the photoelectric conversion elements S11 to S33 are set in the dark state as in the photoelectric conversion element 100 described in the fourth embodiment, and the light incident amount is zero.

Referring to FIG. 28, when the signals on the lines g1 to g3 change to Lo level and those on the lines s1 to s3 change to Hi level, since the input terminal of the integral detector Amp is designed to have the GND potential, the output $V_{out}$ is set at GND. With this operation, all the photoelectric conversion elements S11 to S33 are set in the photoelectric conversion mode, and at the same time, the capacitors C11 to C33 are initialized. Then, the shift registers SR1 and SR2 apply Lo-level pulses to the control lines g1 to g3 and s1 to s3. In response to these pulses, the switches M1 to M3 of the transfer TFTs T11 to T33 are turned off, and the D electrodes of all the photoelectric conversion elements S11 to S33 are open in DC term but their potentials are held by the capacitors C11 to C33.

The shift register SR1 applies a Hi-level control pulse to the control line g1, and the shift register SR2 applies control pulses to the control lines s1 to s3, thus sequentially outputting outputs v1 to v3 via the transfer TFTs T11 to T33 and the switches M1 to M3. With this operation, two-dimensional information corresponding to the capacitance values of all the photoelectric conversion elements S11 to S33 is obtained as signals v1 to v9.

The pseudo C-V characteristics in FIG. 26 of the fourth embodiment mentioned above will be explained below.

Figure 29:
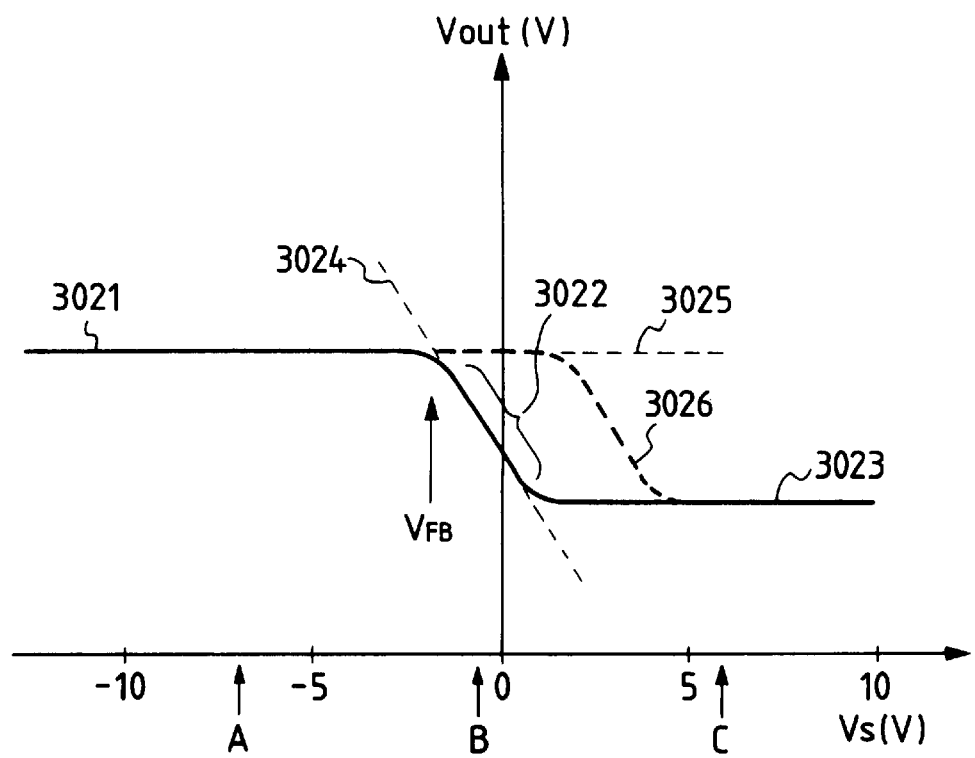
FIG. 29 is a graph for explaining pseudo C-V characteristics of a photoelectric conversion element.

FIG. 29 is a graph for explaining the pseudo C-V characteristics. When the output from the variable voltage power supply $V_s$ shown in FIG. 27 is changed, as indicated by A, B, and C in FIG. 29, the capacitance values of all the photoelectric conversion elements S11 to S33 change, and the charges accumulated on the D electrodes of all the photoelectric conversion elements S11 to S33 and the D electrode sides of the capacitors C11 to C33 change accordingly. The waveforms $V_{out}$ A, B, and C in FIG. 28 represent such states.

As can be seen from FIG. 28, when the output from the variable voltage power supply $V_s$ is changed, the capacitance values of all the photoelectric conversion elements S11 to S33 change, and the charges accumulated on the D electrodes of all the photoelectric conversion elements S11 to S33 and the D electrode sides of the capacitors C11 to C33 change accordingly. Consequently, the pseudo C-V characteristics, i.e., the flat-band voltage, can be obtained.

In this embodiment, nine pixels are two-dimensionally arranged in a 3×3 matrix, and outputs in units of three pixels are simultaneously transferred and output three times. However, the present invention is not limited to such specific arrangement. For example, 5×5 pixels per $mm^2$ may be two-dimensionally arranged as a 2,000×2,000 matrix.

<Sixth Embodiment>

FIG. 30 is a block diagram showing an example of the overall system using the photoelectric conversion device of the present invention. An a-Si sensor board 6001 is used. In FIG. 30, a plurality of shift registers SR1 are connected in series with each other, and a plurality of detection integrated circuits IC are driven. The outputs from the detection integrated circuits IC are input to analog-to-digital (A/D) converters 6002 in a processing circuit 6008, and are converted into digital data. These outputs are stored in memories 6004 via fixed pattern correction subtracters 6003. The digital data in the memories 6004 are transferred to an image processor 6007 serving as a signal processing means via a buffer 6006 under the control of a controller 6005, and are subjected to image processing.

Figure 31A:
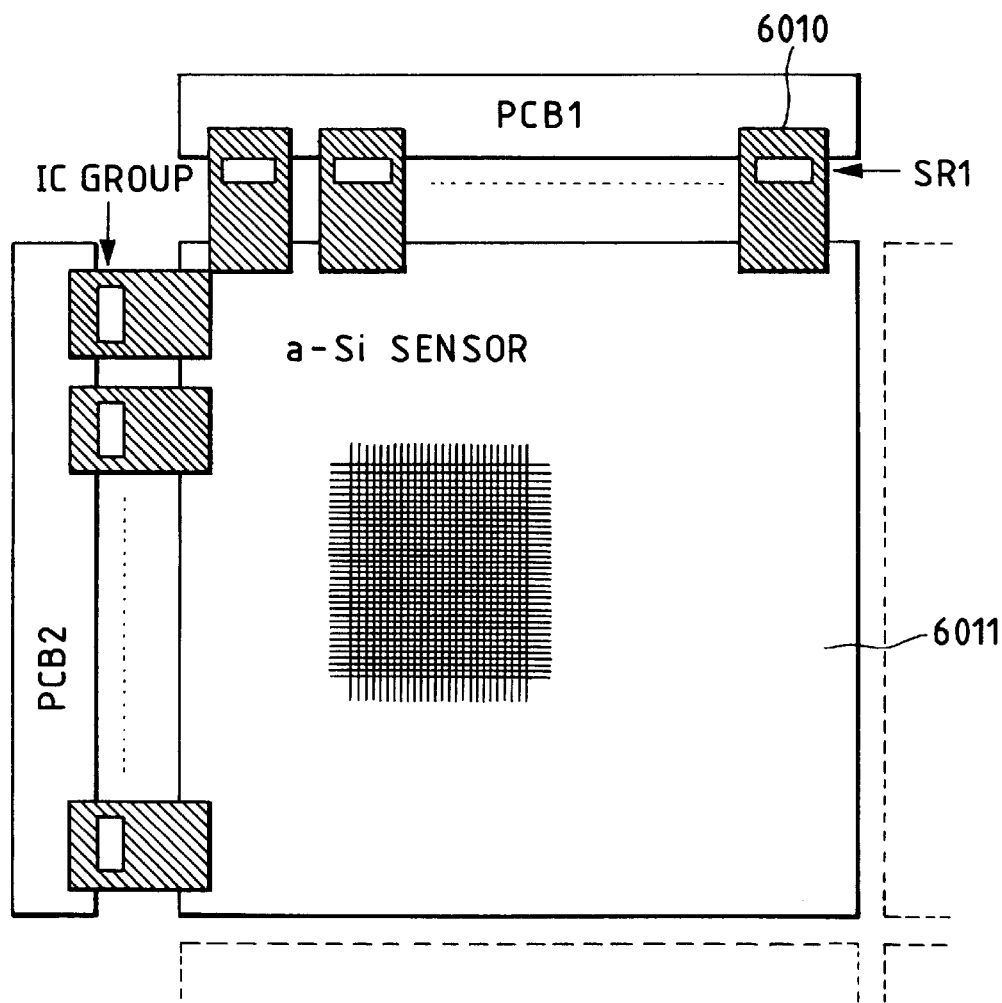
FIG. 31A is a plan view for explaining an example of a photoelectric conversion device.
Figure 31B:
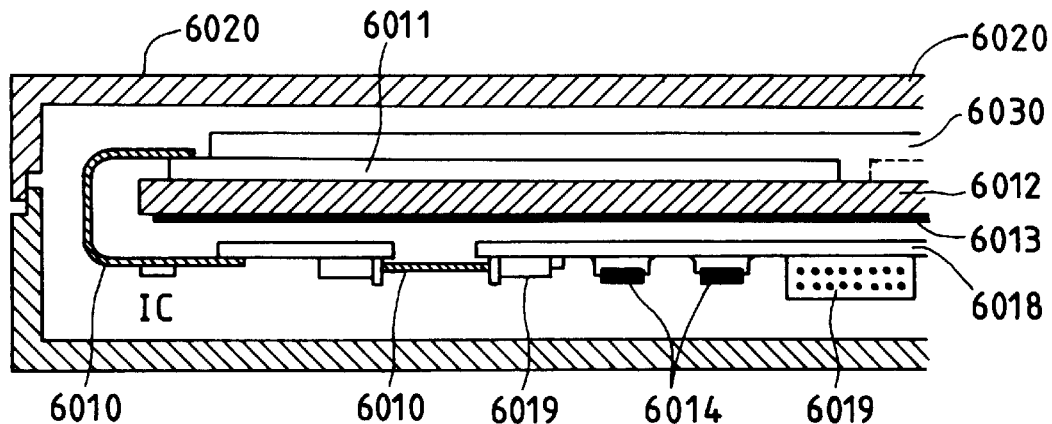
FIG. 31B is a schematic sectional view of the photoelectric conversion device shown in FIG. 31A.

FIGS. 31A and 31B are respectively a plan view and a sectional view showing the arrangement used when the present invention is applied to a photoelectric conversion device for detecting X-rays.

A plurality of photoelectric conversion elements and TFTs are formed within an a-Si sensor board 6011, and flexible circuit boards 6010 on each of which a shift register SR1 and a detection integrated circuit IC are mounted are connected to the board 6011. The terminals of the flexible circuit boards 6010 on the side opposite to the board 6011 are connected to circuit boards PCB1 and PCB2. A plurality of a-Si sensor boards 6011 are adhered on a base 6012. On the lower surface of the base 6012 that constitutes a large-scale photoelectric conversion device, a lead plate 6013 for protecting memories 6014 in processing circuits 6019 mounted on a board 6018 from X-rays is arranged. A phosphor (e.g., CsI) 6030 serving as a wavelength converter for converting X-rays into visible light is applied or adhered on the a-Si sensor board 6011. Based on the same principle as that described above with reference to FIG. 6, this photoelectric conversion device can detect X-rays. In this embodiment, the overall device is housed in, e.g., a carbon fiber case 6020 which transmits X-rays and shields visible light, as shown in FIG. 31B.

Figure 32:
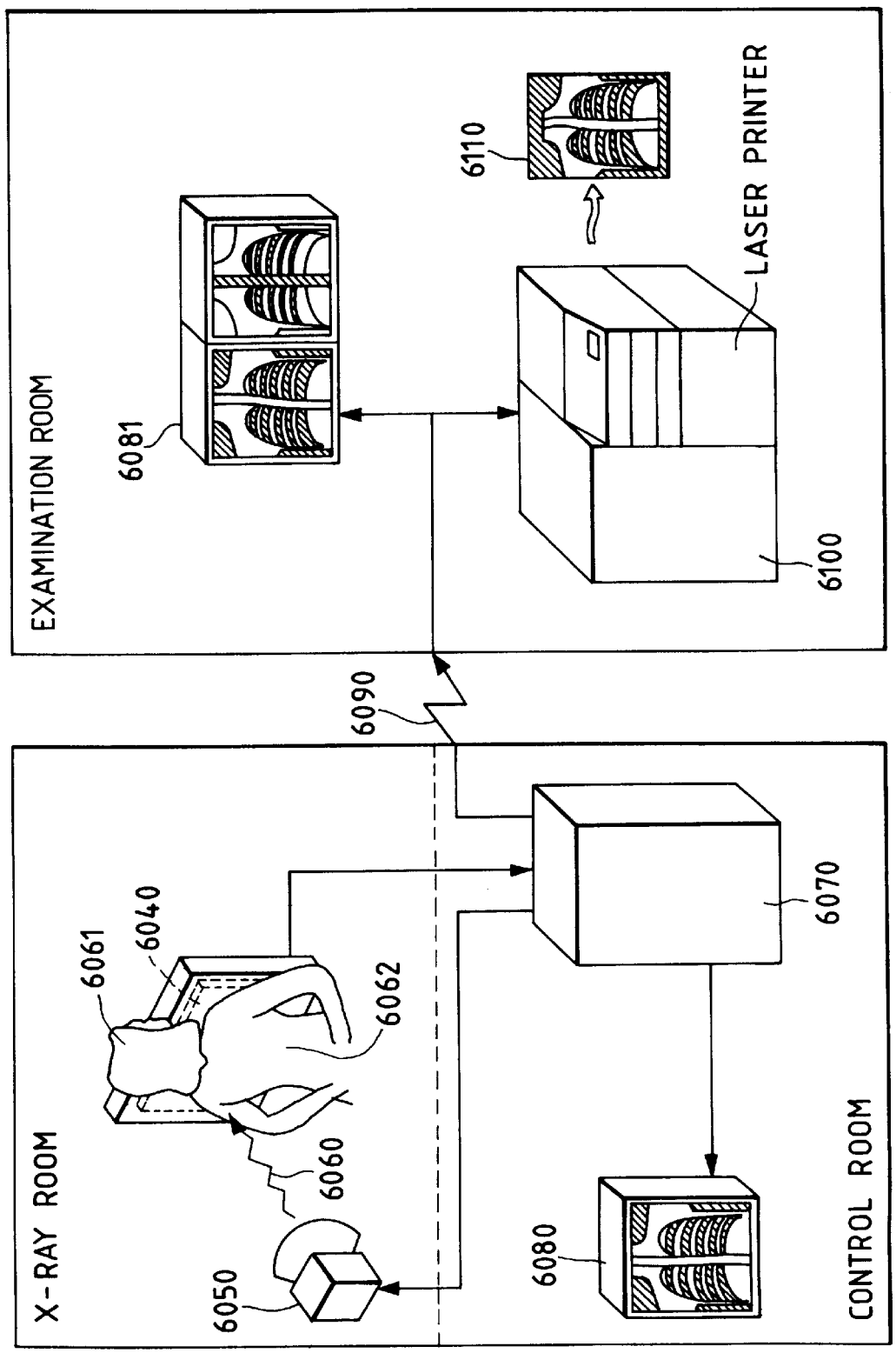
FIG. 32 is a schematic diagram for explaining an example of a system having the photoelectric conversion device.

FIG. 32 shows an application example of the photoelectric conversion device of the present invention to an examination system.

X-rays 6060 produced by an X-ray tube 6050 are transmitted through a chest portion 6062 of an object 6061 to be examined such as a patient, object to be inspected, or the like, and enter a photoelectric conversion device 6040 which has a phosphor on its upper portion. The input X-rays include information concerning the interior of the object 6061 to be examined. The phosphor emits light in response to the incoming X-rays and the light is, in turn, photoelectrically converted to obtain electrical information. This information is converted into digital data and is subjected to image processing by an image processor 6070. The processed data can be observed on a display 6080 in a control room.

Also, this information can be transferred to a remote place via a transmission means such as a telephone line 6090 or the like, and can be displayed on a display 6081 or saved in a memory means such as an optical disk in an examination room such as a doctor room at another place, thus allowing diagnosis by examiners such as doctors, experts, and the like at the remote place. Also, the information can be recorded on a film 6110 by a film processor 6100.

As described above, the photoelectric conversion device of the present invention can be driven while switching the photoelectric conversion mode, refresh mode, and flat-band voltage shift compensation mode in turn, and can suppress the above-mentioned shift of the flat-band voltage. For this reason, the dynamic range of the sensor can be prevented from narrowing, and a high S/N ratio and stable characteristics can be assured.

Also, according to the photoelectric conversion device of the present invention, in order to measure shifts of the flat-band voltage of the photoelectric conversion element, a voltage value corresponding to the flat-band voltage of the photoelectric conversion element is obtained by changing the electric field to be applied to the individual layers of the photoelectric conversion element in the photoelectric conversion mode and detecting the carrier of the first type accumulated in the semiconductor layer or the carrier of the second type flowing toward the second electrode layer, and the flat-band voltage shift are restrained using the detection result. In this manner, the dynamic range can be consequently prevented from narrowing, and a high S/N ratio and stable characteristics can be assured.

Furthermore, according to the present invention, a photoelectric conversion device with a high S/N ratio and stable characteristics, its driving method, and a system having the device can be provided.

By using the photoelectric conversion device with excellent characteristics, a large-area, high-performance, high-characteristics facsimile apparatus and X-ray radiography apparatus can be provided.

In addition, according to the present invention, a photoelectric conversion device which can be formed together with a TFT in a single process, and can be manufactured with low cost without complicating the manufacturing process, its driving method, and a system having the device can be provided.

What is claimed is:

1. A photoelectric conversion device, which has a photoelectric conversion element formed by stacking, on an insulating substrate, successively, a first electrode layer, a first insulating layer for blocking passage of both a carrier of a first type and a carrier of a second type having a different polarity from a polarity of the carrier of the first type, a photoelectric conversion semiconductor layer, an injection blocking layer for blocking injection of the carrier of the first type into said semiconductor layer, and a second electrode layer, comprising:

switch means for repetitively performing in a predetermined order, following three operation modes for applying an electric field to the individual layers of said photoelectric conversion element:

(1) a photoelectric conversion mode for producing and accumulating a charge in correspondence with an incident light amount;

(2) a refresh mode for refreshing the charge accumulated in said photoelectric conversion element; and (3) a flat-band voltage shift restraining mode for restraining a shift of a flat-band voltage of said photoelectric conversion element.

2. A device according to claim 1, wherein the flat-band voltage shift compensation mode is the operation mode which applies the electric field to the individual layers under a condition $\{(V_{rG} \cdot q) \geq (V_D \cdot q - V_{FB} \cdot q)\}$ that a product $(V_{rG} \cdot q)$ of a voltage $(V_{rG})$ of said first electrode layer of said photoelectric conversion element and a charge (q) of the carrier of the first type is larger than the product $\{(V_D - V_{FB}) \cdot q\}$ of a voltage $(V_D - V_{FB})$ obtained by subtracting a flat-band voltage $(V_{FB})$ from a voltage $(V_D)$ of said second electrode layer, and the charge (q) of the carrier of the first type.

3. A device according to claim 2, wherein a plurality of photoelectric conversion elements equivalent to said photoelectric conversion element are one- or two-dimensionally arranged, a plurality of switch elements equivalent to said switch element are connected in units of photoelectric conversion elements, all the photoelectric conversion elements are divided into a plurality of n blocks, said switch elements operate in units of blocks to output optical signals from all the n×m photoelectric conversion elements divided into the plurality of n blocks via matrix signal lines, each crossing portion of the matrix signal lines is constituted by stacking at least a first electrode layer, an insulating layer, a semiconductor layer, and a second electrode layer in a multilayered structure in an order named, and the individual layers of the multilayered structure are formed by the same layers as said first electrode layer, said insulating layer, said photoelectric conversion semiconductor layer, and said second electrode layer of said photoelectric conversion element and have the same thicknesses as the thicknesses thereof.

4. A photoelectric conversion device, which has a photoelectric conversion element formed by stacking, on an insulating substrate, a first electrode layer, a first insulating layer for blocking passage of both a carrier of a first type and a carrier of a second type having a different plarity from a polarity of the carrier of the first type, a photoelectric conversion semiconductor layer, an injection blocking layer for blocking injection of the carrier of the first type into said semiconductor layer, and a second electrode layer, comprising:

flat-band voltage measuring means for said photoelectric conversion element;

output reading means including flat-band voltage shift compensation means using the measurement result; and switch means for switching between said flat-band voltage compensation means and said output reading means, wherein said flat-band voltage measuring means comprises means for obtaining a voltage value corresponding to a flat-band voltage of said photoelectric conversion element by changing an electric field to be applied to the individual layers of said photoelectric conversion element, and detecting the carrier of the first type accumulated in said semiconductor layer of said photoelectric conversion element or the carrier of the second type flowing toward said second electrode layer at that time, and said output reading means comprises switch means for switching a potential to be applied to the individual layers of said photoelectric conversion element so as to selectively performing in turn:

(a) a photoelectric conversion mode for producing and accumulating a charge in correspondence with an incident light amount;

(b) a refresh mode for refreshing the charge accumulated in said photoelectric conversion element; and (c) a flat-band voltage shift restraining mode for restraining a shift of the flat-band voltage of said photoelectric conversion element.

5. A device according to claim 4, further comprising:

a flat-band voltage measurement variable voltage power supply, and a refresh voltage power supply, which are switched by said switch means and apply a voltage to said photoelectric conversion element in a flat-band voltage measuring mode;

a flat-band voltage shift restraining voltage power supply, a refresh voltage power supply, and a read voltage power supply, which are switched by said switch means and apply a voltage to said photoelectric conversion element in an output read mode; and switch means for switching the flat-band voltage measuring mode and the output read mode.

6. A device according to claim 5, wherein the flat-band voltage is measured by detecting a change in charge accumulated in said photoelectric conversion element by changing a voltage from said flat-band voltage measurement variable voltage power supply to change a capacitance value of said photoelectric conversion element.

7. A device according to claim 5, wherein an electric field in a direction opposite to a direction in a photoelectric conversion operation is applied to said photoelectric conversion element so as to restraining the shift of the flat-band voltage of said photoelectric conversion element.

8. A device according to claim 5, wherein a plurality of photoelectric conversion elements equivalent to said photoelectric conversion element are one- or two-dimensionally arranged, a plurality of switch elements equivalent to said switch element are connected in units of photoelectric conversion elements, all the photoelectric conversion elements are divided into a plurality of n blocks, said switch elements operate in units of blocks to output optical signals from all the n×m photoelectric conversion elements divided into the plurality of n blocks via matrix signal lines, each crossing portion of the matrix signal lines is constituted by stacking at least a first electrode layer, an insulating layer, a semiconductor layer, and a second electrode layer in a multilayered structure in an order named, and the individual layers of the multilayered structure are formed by the same layers as said first electrode layer, said insulating layer, said photoelectric conversion semiconductor layer, and said second electrode layer of said photoelectric conversion element and have the same thicknesses as the thicknesses thereof.

9. A system comprising:

a photoelectric conversion device of claim 1;

signal processing means for processing a signal from said photoelectric conversion device; and a light source for generating light information to be input to said photoelectric conversion device.

10. A system according to claim 9, wherein said photoelectric conversion device comprises a wavelength converter for converting a wavelength of light from said light source.

11. A system according to claim 10, wherein said wavelength converter comprises a phosphor.

12. A system according to claim 9, wherein said light source comprises an X-ray source.

13. A system according to claim 9, further comprising recording means for recording a signal from said signal processing means.

14. A system according to claim 9, further comprising display means for displaying a signal from said signal processing means.

15. A system according to claim 9, further comprising transmission means for transmitting a signal from said signal processing means.

16. A system comprising:
a photoelectric conversion device of claim 1;
signal processing means for processing a signal from said photoelectric conversion device; and
a light source for generating light information to be input to said photoelectric conversion device.

17. A system according to claim 16, wherein said photoelectric conversion device comprises a wavelength converter for converting a wavelength of light from said light source.

18. A system according to claim 17, wherein said wavelength converter comprises a phosphor.

19. A system according to claim 16, wherein said light source comprises an X-ray source.

20. A system according to claim 16, further comprising recording means for recording a signal from said signal processing means.

21. A system according to claim 16, further comprising display means for displaying a signal from said signal processing means.

22. A system according to claim 16, further comprising transmission means for transmitting a signal from said signal processing means.

23. A method of driving a photoelectric conversion device, which has a photoelectric conversion element formed by stacking, succesively, on an insulating substrate, a first electrode layer, a first insulating layer for blocking passage of both a carrier of a first type and a carrier of a second type having a different polarity from a polarity of the carrier of the first type, a photoelectric conversion semiconductor layer, an injection blocking layer for blocking injection of the carrier of the first type into said semiconductor layer, and a second electrode layer,
wherein following three operation modes for applying an electric field to the individual layers of the photoelectric conversion element are switched by switch means and are repetitively performedin a predetermined order:
(1) a photoelectric conversion mode for producing and accumulating a charge in correspondence with an incident light amount;
(2) a refresh mode for refreshing the charge accumulated in said photoelectric conversion element; and
(3) a flat-band voltage shift restraining mode for restraining a shift of a flat-band voltage of said photoelectric conversion element.

24. A method according to claim 23, wherein the flat-band voltage shift compensation mode is the operation mode which applies the electric field to the individual layers under a condition $\{(V_{rG} \cdot q) \geq (V_D \cdot q - V_{FB} \cdot q)\}$ that a product $(V_{rG} \cdot q)$ of a voltage $(V_{rG})$ of said first electrode layer of said photoelectric conversion element and a charge (q) of the carrier of the first type is larger than the product $\{(V_D - V_{FB}) \cdot q\}$ of a voltage $(V_D - V_{FB})$ obtained by subtracting a flat-band voltage $(V_{FB})$ from a voltage $(V_D)$ of said second electrode layer, and the charge (q) of the carrier of the first type.

25. A method of driving a photoelectric conversion device, which has a photoelectric conversion element formed by stacking, on an insulating substrate, successively, a first electrode layer, a first insulating layer for blocking passage of both a carrier of a first type and a carrier of a second type having a different polarity from a polarity of the carrier of the first type, a photoelectric conversion semiconductor layer, an injection blocking layer for blocking injection of the carrier of the first type into said semiconductor layer, and a second electrode layer,
wherein said method has
a flat-band voltage measuring mode for obtaining a voltage value corresponding to a flat-band voltage of said photoelectric conversion element by changing an electric field to be applied to the individual layers of said photoelectric conversion element, and detecting the carrier of the first type accumulated in said semiconductor layer of said photoelectric conversion element or the carrier of the second type flowing toward said second electrode layer at that time, and
an output read mode, which includes following three modes which are performed by switching a voltage to be applied to said photoelectric conversion elements:
(a) a photoelectric conversion mode for producing and accumulating a charge in correspondence with an incident light amount;
(b) a refresh mode for refreshing the charge accumulated in said photoelectric conversion element; and
(c) a flat-band voltage shift restraining mode for restraining a shift of the flat-band voltage of said photoelectric conversion element, and
said switch means selectively performing the flat-band voltage measuring mode and the output read mode.

26. A method of driving a photoelectric conversion device, which comprises
a photoelectric conversion element formed by stacking, on an insulating substrate, a first electrode layer, a first insulating layer for blocking passage of both a carrier of a first type and a carrier of a second type having a different polarity from a polarity of the carrier of the first type, a photoelectric conversion semiconductor layer, an injection blocking layer for blocking injection of the carrier of the first type into said semiconductor layer, and a second electrode layer,
a power supply unit for applying an electric field to the individual layers of said photoelectric conversion element in a direction to flow the carrier of the first type from said semiconductor layer toward said second electrode layer in a refresh mode, and applying an electric field to the individual layers of said photoelectric conversion element in a direction to make the carrier of the first type produced by light incident on said semiconductor layer stay inside said semiconductor layer, and to flow the carrier of the second type toward said second electrode layer, and
a detection unit for detecting the carrier of the first type accumulated in said semiconductor layer or the carrier of the second type flowing toward said second electrode layer in the photoelectric conversion mode,
wherein said method has
a flat-band voltage measuring mode for obtaining a voltage value corresponding to a flat-band voltage of said photoelectric conversion element by changing an electric field to be applied to the individual layers of said photoelectric conversion element, and detecting the carrier of the first type accumulated in said semiconductor layer of said photoelectric conversion element or the carrier of the second type flowing toward said second electrode layer at that time, and a flat-band voltage shift restraining mode for applying an electric field in a direction opposite to a direction in a photoelectric conversion operation to said photoelectric conversion element so as to restrain the shift of the flat-band voltage of said photoelectric conversion element using the measurement result.

27. A method of driving a photoelectric conversion device according to claim 26, in which a plurality of photoelectric conversion elements equivalent to said photoelectric conversion element are one- or two-dimensionally arranged, a plurality of switch elements equivalent to said switch element are connected in units of photoelectric conversion elements, all the photoelectric conversion elements are divided into a plurality of n blocks, said switch elements operate in units of blocks to output optical signals from all the n×m photoelectric conversion elements divided into the plurality of n blocks via matrix signal lines, each crossing portion of the matrix signal lines is constituted by stacking at least a first electrode layer, an insulating layer, a semiconductor layer, and a second electrode layer in a multilayered structure in an order named, and the individual layers of the multilayered structure are formed by the same layers as said first electrode layer, said insulating layer, said photoelectric conversion semiconductor layer, and said second electrode layer of said photoelectric conversion element and have the same thicknesses as the thicknesses thereof, wherein a voltage value corresponding to a flat-band voltage of each photoelectric conversion element is obtained in units of n blocks.

* * * * *

UNITED STATES PATENT AND TRADEMARK OFFICE
CERTIFICATE OF CORRECTION

PATENT NO. : 5,841,180
DATED : November 24, 1998
INVENTOR(S) : ISAO KOBAYASHI, ET AL.

It is certified that error appears in the above-identified patent and that said Letters Patent is hereby corrected as shown below:

COLUMN 1

Figure 1A:
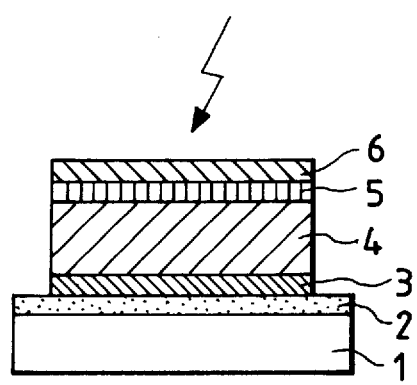
FIGS. 1A and 1B are schematic sectional views for explaining examples of photosensors.
Figure 1B:
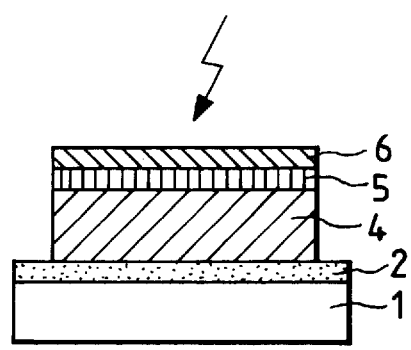
Figure 1C:
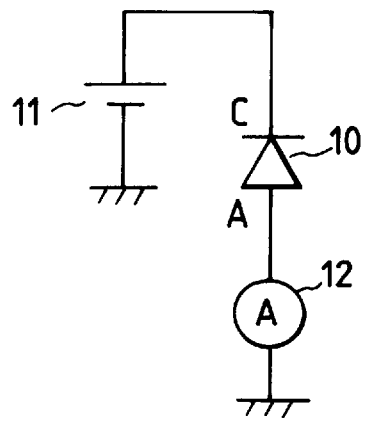
FIG. 1C is a schematic equivalent circuit diagram using the photosensor shown in FIG. 1A and 1B.
Figure 2:
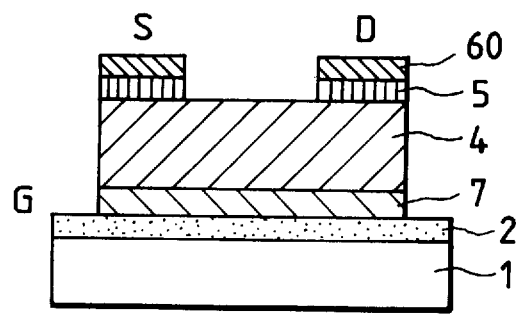
FIG. 2 is a schematic sectional view for explaining an example of a thin-film transistor (TFT)
Figure 3:
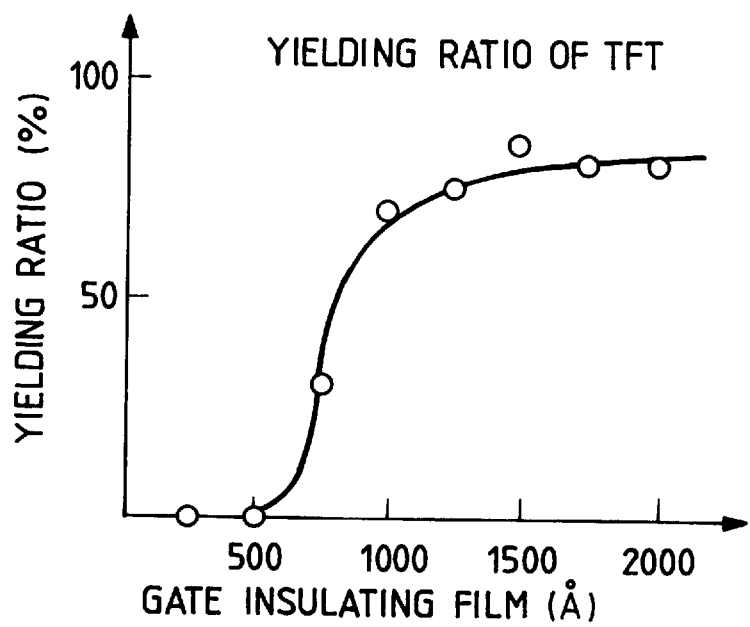
FIG. 3 is a graph for explaining the relationship between the thickness of the gate insulating film and the yielding ratio.

Line 40, "(FIG. 1A," should read --(FIG. 1A),--.

COLUMN 3

Line 44, "-the" should read --the--.

COLUMN 4

Line 24, "complicate" should read --complicated--.

COLUMN 5

Line 35, "anther" should read --another--.
Line 37, "performing," should read --performs,--.

COLUMN 10

Line 45, "la y er," should read --layer,--.

COLUMN 13

Line 37, "of" should read --of the--.
Line 59, "usec" should read --$\mu$sec--.

COLUMN 14

Line 57, "the manufacture" should read --manufacturing,--.

UNITED STATES PATENT AND TRADEMARK OFFICE
CERTIFICATE OF CORRECTION

PATENT NO. : 5,841,180

DATED : November 24, 1998

INVENTOR(S): ISAO KOBAYASHI, ET AL.

Page 2 of 3

It is certified that error appears in the above-identified patent and that said Letters Patent is hereby corrected as shown below:

COLUMN 16

Line 45, "Only the" should read --The only--.

COLUMN 17

Line 44, "that shows" should read --showing--.
Line 46, "of" should read --of the--.

COLUMN 18

Line 19, "matrix-driven ," should read --matrix-driven,--.

COLUMN 22

Line 40, "cmX40 cm," should read --cm X 40cm--.

COLUMN 24

Line 11, "n blocks," should read --n-blocks,--.

COLUMN 33

Line 35, "plarity" should read --polarity--;
Line 62, "performing" should read --perform--.

COLUMN 34

Line 29, "restraining" should read --restrain--.

UNITED STATES PATENT AND TRADEMARK OFFICE
CERTIFICATE OF CORRECTION

PATENT NO. : 5,841,180

DATED : November 24, 1998

INVENTOR(S) : ISAO KOBAYASHI, ET AL.

It is certified that error appears in the above-identified patent and that said Letters Patent is hereby corrected as shown below:

COLUMN 35

Line 43, "performedin" should read --performed in--.

Signed and Sealed this

Thirtieth Day of November, 1999

Attest:

Q. TODD DICKINSON

Attesting Officer

Acting Commissioner of Patents and Trademarks